United States Patent
Kumar

(10) Patent No.: US 8,219,689 B2
(45) Date of Patent: *Jul. 10, 2012

(54) SYSTEM AND METHOD FOR EXPERT SERVICE PROVIDERS TO PROVIDE ONE ON ONE CHAT ADVICE SERVICES THROUGH UNIQUE EMPOWERED INDEPENDENT AGENTS TO CONSUMERS

(76) Inventor: Gopesh Kumar, Pleasanton, CA (US)

(*) Notice: Subject to any disclaimer, the term of this patent is extended or adjusted under 35 U.S.C. 154(b) by 427 days.

This patent is subject to a terminal disclaimer.

(21) Appl. No.: 12/697,279

(22) Filed: Jan. 31, 2010

(65) Prior Publication Data
US 2010/0131867 A1  May 27, 2010

Related U.S. Application Data

(63) Continuation of application No. 10/711,549, filed on Sep. 24, 2004, now Pat. No. 8,046,472.

(51) Int. Cl.
*G06F 15/16* (2006.01)
(52) U.S. Cl. .......... 709/227; 709/202; 709/230; 705/38; 705/40; 379/114; 379/265
(58) Field of Classification Search .................. 709/202, 709/227, 230; 705/38, 40; 379/114, 265
See application file for complete search history.

(56) References Cited

U.S. PATENT DOCUMENTS

| | | | | |
|---|---|---|---|---|
| 5,577,100 | A * | 11/1996 | McGregor et al. | 455/406 |
| 6,463,149 | B1 * | 10/2002 | Jolissaint et al. | 379/265.09 |
| 6,493,437 | B1 * | 12/2002 | Olshansky | 379/114.13 |
| 6,535,492 | B2 * | 3/2003 | Shtivelman | 370/270 |
| 7,289,612 | B2 * | 10/2007 | Lurie et al. | 379/114.1 |
| 7,289,623 | B2 * | 10/2007 | Lurie | 379/221.02 |
| 8,015,292 | B2 * | 9/2011 | Kumar | 709/227 |
| 8,046,472 | B2 * | 10/2011 | Kumar | 709/227 |
| 2002/0010608 | A1 * | 1/2002 | Faber et al. | 705/8 |
| 2002/0103693 | A1 * | 8/2002 | Bayer et al. | 705/10 |
| 2002/0111907 | A1 * | 8/2002 | Ling | 705/41 |
| 2003/0092446 | A1 * | 5/2003 | Boivin | 455/445 |
| 2004/0122941 | A1 * | 6/2004 | Creamer et al. | 709/224 |
| 2004/0252820 | A1 * | 12/2004 | Faber et al. | 379/201.12 |
| 2005/0086290 | A1 * | 4/2005 | Joyce et al. | 709/202 |
| 2007/0061405 | A1 * | 3/2007 | Keohane et al. | 709/207 |

* cited by examiner

*Primary Examiner* — John Follansbee
*Assistant Examiner* — Anthony Mejia
(74) *Attorney, Agent, or Firm* — White-Welker & Welker, LLC; Matthew T. Welker, Esq.

(57) ABSTRACT

The present invention provides techniques for managing, supporting and empowering Independent Agents to offer a method for enabling expert Service Providers to deliver, and charge for, advice to consumers, by connecting two parties in real time in an online chat. The present invention also provides the method and techniques for expert Service Providers, in turn, to provide their service through a multiplicity of Independent Agent channels without the potential for communication device conflict; thereby ensuring successful connections for consumers.

19 Claims, 31 Drawing Sheets

Fig. 2

Click4Advisor Chat Service

Logout | Allowed Time: 2 minutes | Elapsed Time: 0:07

FAQs Terms Logged as:

(17:10:52) ChatMgr: rg5 logs into the Chat.
(17:10:52) ChatMgr: Your invitation to "rg2" to join chat session with [rg5] has been sent. Please wait while we connect you to your advisor....
(17:11:06) ChatMgr: rg2 accepted the invitation and is now connected with this chat session.
(17:11:14) ChatMgr: This free chat session will end very soon and the paid chat session will begin automatically after it.
(17:11:13) rg2: hi matt
(17:11:26) rg2: How can I help?
(17:11:56) rg5: Hello, I have a question.
(17:12:38) ChatMgr: The Paid Chat Session has been started for User rg5.

General Information

Balance: $2.15
Add Money
Available Advisors
Privacy Policy
How to Make Session Safe This is a paid session with Advisor "rg2".

Quit Chat Session

Rate Per Minute: $0.99
Available Paid Minutes: 2

0/1000   Submit

Fig. 5

Click4Advisor Chat Service

Logout | Allowed Time: 2 minutes | Elapsed Time: 0:1:30 | The paid chat will end in 30 seconds FAQs Terms Logged as:

(17:10:52) ChatMgr: rg5 logs into the Chat.
(17:10:52) ChatMgr: Your invitation to "rg2" to join chat session with [rg5] has been sent. Please wait while we connect you to your advisor....
(17:11:06) ChatMgr: rg2 accepted the invitation and is now connected with this chat session.
(17:11:14) ChatMgr: This free chat session will end very soon and the paid chat session will begin automatically after it.
(17:11:13) rg2: hi matt
(17:11:26) rg2: How can I help?
(17:11:56) rg5: Hello, I have a question.
(17:12:36) ChatMgr: The Paid Chat Session has been started for User rg5.
(17:13:27) rg2: May I have your question please?

General Information

Balance: $2.15
Add Money
Available Advisors
Privacy Policy
How to Make Session Safe This is a paid session with Advisor "rg2".

Quit Chat Session

Rate Per Minute: $0.99
Available Paid Minutes: 2

0/1000  Submit

Fig. 6

Click4Advisor Chat Service

Logout | Search By Advisor: [rg2] [GO] OR Search By Dial-In ID: [ ] [GO]

FAQs Terms Logged as:

(17:38:34) *ChatMgr: rg5 logs into the Chat.*
(17:39:18) *ChatMgr: The Advisor rg2 is available to chat. Click here invite to chat.*

General Information

Balance: $9.01
Add Money
Available Advisors
Privacy Policy
How to Make Session Safe 0/1000 Submit Done

Click4Advisor Member Web Interface

Billing Information | Update Email/Password | Manage Advisors | Cancel an Advisor | Sub-Account

Advisors Information

Select an Advisor

All ▼ [Search]

Advisor Information - [ Download as .csv file ]

| Advisor Id | Advisor Name | Full Name | Email | Phone | CID | Linker | Rate | Mass Email | Self-Approved Mass Email | Conf | Chat |
|---|---|---|---|---|---|---|---|---|---|---|---|
| 4319 | rg202 | G K | gk@zifftalk.com | 9254699600 | 1175 | 4319 | $1 | No Code | No | Yes | Yes |
| 138 | rg105 | Gopesh Kumar | support@click4advisor.com | 4082212047 | 220 | 138 | $0.99 | Code Yes | Yes | No | No |
| 31 | rg2 | G K | gk@zifftalk.com | 4082212047 | 136 | test1 | $0.99 | Code Yes | Yes | Yes | Yes |

Page 1 of 1

Copyright © SPG Solutions Inc., Click4Talk.com, ZiffTalk.com, ZiffLeads.com, and Click4Advisor.com 2001-2010.  User Agreement  Advisor Agreement

Advisor Profile

You must fill out each field in your Profile below in order to begin using the Click4Advisor service. Once your profile information is saved, you should preview Click4Advisor service popup page. Click Here to Preview Click4Advisor Service Popup Page Play Recorded Advisor Name

| Field | Value |
|---|---|
| Category: | Business |
| Sub-Category: | Consulting |
| Phone Number to Receive Calls: | (+1) USA / Canada ▼ 4082212047  Example: 9254699600 more info... <br> View Phone Link Code Information |
| Rate Per Minute(in USD): | 0.99  $0.99 minimum. Do not enter "$" sign. |
| Service Description (in brief): | Free Demo of Click4Advisor system |
| Complete Service Detail: | The purpose of this call is to demonstrate how Click4Advisor system works. Or, if you have any questions, you can feel free to talk to us. This call is not meant to provide any free advice service. <br><br> Notes: This information will be available for public display. Please enter plain text with no HTML tags/links. 4000 character limit. |
| Education, Experience, Credentials & Affiliations: | Click4Advisor offers Advisor Group programs to empower capable Advisor Group Leaders to develop their own businesses by pooling the collective expertise of numerous Advisors and promoting the Group through their own website and other online marketing vehicles. Click4Advisor allows Users to review Advisors Profile and Feedback from other Users before calling, and ensures a successful and secure connection. <br><br> Notes: This information will be available for public display. Please enter plain text with no HTML tags/links. 4000 character limit. |
| Chat Alert? | No ▼  Send Me Chat Invitation Alert by Phone. |
| Chat Rate Per Minute(in USD): | $0.99 minimum. Do not enter "$" sign. This chat rate will be used for chat service only. If there is no chat rate assigned, the chat service will use the above phone rate. |

Submit

Click4Advisor Chat Service

Logout | Allowed Time: 2 minutes | Elapsed Time: 0:2:0 | The chat session is finished | FAQs Terms Logged as:

(17:10:52) *ChatMgr:* rg5 logs into the Chat.
(17:10:52) *ChatMgr:* Your invitation to "rg2" to join chat session with [rg5] has been sent. Please wait while we connect you to your advisor....
(17:11:06) *ChatMgr:* rg2 accepted the invitation and is now connected with this chat session.
(17:11:14) *ChatMgr:* This free chat session will end very soon and the paid chat session will begin automatically after it.
(17:11:13) *rg2:* hi matt
(17:11:26) *rg2:* How can I help?
(17:11:56) *rg5:* Hello, I have a question.
(17:12:38) *ChatMgr:* The Paid Chat Session has been started for User rg5.
(17:13:27) *rg2:* May I have your question please?
(17:15:10) *rg5:* Okay
(17:15:12) *ChatMgr:* Your uninvitation to rg2 for channel [rg5] has been sent.

General Information

Balance: $2.15
Add Money
Available Advisors
Privacy Policy
How to Make Session Safe This is a paid session with Advisor "rg2":

Quit Chat Session

Rate Per Minute: $0.99
Available Paid Minutes: 2

0/1000  Submit

Fig. 25

Click4Advisor Member Web Interface

Submit Chatback Request

You can use this page to submit a new or to change an existing chatback request. When you change an existing chatback request, it does not effect your queue number. To add more money to your account click here.

Advisor Name: rg2
Chat Rate Per Minute (in USD): 0.99
Available to Chat for next: 2 hours
Enter Phone Number for Alert: (+1) USA / Canada
Example: 9254699600. You will receive a phone alert when the advisor becomes available to chat.
[New User? Register Now!]
User Name:
User Password:

[Submit]

Close Window

Fig. 26

Click4Advisor Member Web Interface

View Chatback Requests

The chatback requests are processed every 5 minutes once the advisor becomes available to chat. To see the most current information, you should refresh this page. Here is a list of your chatback requests:

| Id | Date/Time | Advisor Name | Available for Chatback (in hours) | Phone Number to Receive Phone Alert | Advisor Status | Queue Number | Delete Request |
|----|-----------|--------------|-----------------------------------|-------------------------------------|----------------|--------------|----------------|
| 9 | January 21, 2010 02:17PM | rg2 | 2 | 9254699600 | Unavailable | 1 | ☐ |

Submit - Delete Chatback Request(s)

Close Window

Click4Advisor Member Web Interface

Usage Information | Make Deposit | Callback Requests | Free Minutes | Scheduled Calls | My Advisor List | Delete Advisor List | Block a Advisor | Blocked Advisors

My Advisor List

Click here to Buy Gift Certificates    The current balance is $10.00

Here, you can view all the advisors that you have called in the past. To delete advisors from "My Advisor List", Click here.

Advisor      Order By
All    v    Last Contacted Date v   [Search]

| Last Contacted Date | Dial-In Id | Advisor Name | Website | Status | Email | Feedback | Request Scheduled Call FAQs |
|---|---|---|---|---|---|---|---|
| January 21, 2010 02:15PM | 10031 | rg2 | www.Click4Advisor.com | Available. Call Now | Send Email | | Request a Scheduled Call |
| January 19, 2010 11:48AM | 52163 | Eileen 333 | www.12Angel.com | Not Available. Submit a Callback Request | Send Email | | Request a Scheduled Call |
| January 12, 2010 12:54PM | 34342 | Mark Husson | www.12Listen.com | Not Available. Submit a Callback Request | Send Email | | Request a Scheduled Call |
| January 08, 2010 04:19PM | 14319 | rg 202 | | Not Available. Submit a Callback Request | Send Email | | Request a Scheduled Call |
| October 13, 2009 12:42PM | 34711 | Chris D | www.12Listen.com | On a Call. Submit a Callback Request | Send Email | | Request a Scheduled Call |
| October 12, 2009 04:20PM | 42524 | Bill Moore | www.12Listen.com | Not Available. Submit a Callback Request | Send Email | | Request a Scheduled Call |
| September 03, 2009 09:44AM | 54161 | Katt 12 | www.12Listen.com | Available. Call Now | | | Request a Scheduled Call |
| September 03, 2009 08:57AM | 58157 | labrown22 | www.simplythebestpsychics.com | Available. Call Now | | | Request a Scheduled Call |
| May 15, 2009 12:19PM | 16541 | Princess TJ | www.advisoruniverse.com | Not Available. Submit a Callback Request | Send Email | | Request a Scheduled Call |
| December 17, 2008 11:45AM | 10138 | rg105 | www.Click4Advisor.com | Available. Call Now | | | Request a Scheduled Call |
| April 28, 2008 12:43PM | 12099 | BABES ANGEL REALM | www.advisoruniverse.com | Available. Call Now | | | Request a Scheduled Call |
| April 02, 2008 09:37AM | 36361 | KatsAngeleyes4 | www.predictmyfuture.com | Available. Call Now | | | Request a Scheduled Call |
| March 13, 2008 05:10PM | 37992 | Trinitee1 | www.insightfulpsychics.com | Not Available. Submit a Callback Request | Send Email | | Request a Scheduled Call |
| October 10, 2007 12:21PM | 41043 | Manuela12 | www.12Listen.com | Not Available. Submit a Callback Request | Send Email | | Request a Scheduled Call |

Copyright © SPG Solutions Inc., Click4Talk.com, ZiffLeads.com, ZiffiLeads.com, and Click4Advisor.com 2001-2010.    User Agreement

Fig. 30

SYSTEM AND METHOD FOR EXPERT SERVICE PROVIDERS TO PROVIDE ONE ON ONE CHAT ADVICE SERVICES THROUGH UNIQUE EMPOWERED INDEPENDENT AGENTS TO CONSUMERS

CROSS REFERENCE TO RELATED APPLICATIONS

This application claims priority from and is a continuation of U.S. patent application Ser. No. 10/711,549, entitled "A System and Method for Expert Service Providers to provide advice services through unique empowered Independent Agents to Consumers", filed on 24 Sep. 2004 now U.S. Pat. No. 8,046,472. The benefit under 35 USC §1115(e) of the United States application is hereby claimed, and the aforementioned application is hereby incorporated herein by reference.

This is related to U.S. patent application Ser. No. 10/710,795, entitled "A System and Method for connecting consumers with a diverse set of consultants and experts", filed on 3 Aug. 2004.

SEQUENCE LISTING OR PROGRAM

Not Applicable

FEDERALLY SPONSORED RESEARCH

Not Applicable

TECHNICAL FIELD OF THE INVENTION

The present invention relates to techniques for managing, supporting and empowering Independent Agents to offer a method for enabling expert Service Providers to deliver, and charge for, advice to consumers, by connecting two parties in real time in an online one on one chat. Further, the present invention provides the method and techniques for expert Service Providers, in turn, to provide their service through a multiplicity of Independent Agent channels without potential communication device conflict for consumers.

BACKGROUND OF THE INVENTION

The World Wide Web is currently a subject of intense and rapidly growing interest. The World Wide Web is composed of interconnected data sources that are accessible to computer Users through data-communication networks such as the Internet. The data available on the World Wide Web has been assembled by private individuals, commercial companies, government agencies, and special interest organizations. Much of this assembled information is organized into Web pages. A Web site is a collection of Web pages (and possibly other data which, together with Web pages, are generically referred to as Web components) offered by a sponsoring entity, herein referred to as the site owner.

Large Web sites are typically organized hierarchically. For example, corporate Web sites often consist of smaller Web sites, each providing information about a business unit of the parent company.

The Web site itself resides on one or more server hosts. Web components stored on the server host are offered to Users of the World Wide Web through a software program known as a Web server. A network User uploads or downloads data from a Web site through a browser, a software program running on the client host. The browser establishes contact with the Web server and issues a request for data stored on the server host. This results in data from the server host being downloaded into the browser. This data is typically a HyperText document specifying information required by the browser to display the Web page (i.e., formatting information specifying the structure of the page, or URLs of images that are to be placed on the page), embedded client software programs which run inside the browser (e.g., Java script code), and other content to be downloaded to the client computer or displayable through client software programs that add to the browser's functionality (sometimes referred to as "browser plug-ins").

Currently, Web pages are typically defined using HyperText Markup Language ("HTML"). HTML provides a standard set of tags that define how a Web page is to be displayed. When a User indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

As more and more demand, and the use of technology enter peoples' lives, there exists a great need for people to be able to contact experts and Service Providers easily and quickly on any topic or subject via the Internet. While many companies have web pages and/or telephone support lines, most do not offer the most convenient and integrated way for potential clients to reach them, nor a simple, automated, yet comprehensive method for charging for their services.

There is a need for a system, especially an Internet-based system, that will enable customers to easily and quickly connect to Service Providers from Internet-based icons located in a broad collection of vehicles such as individual websites, website directories, emails, or online advertisement banners, so that these Service Providers can reach and assist these customers with their questions, in return for fair and agreed-upon payment.

Advice services are currently offered through a variety of methods and techniques utilizing the telephone and/or the Internet. A consumer seeking advice on any number of various topics can search in a telephone book's yellow pages, for example, and make a basic telephone call. But advice service providers are not able to effectively or efficiently charge time-based fees for their service in this model, nor are consumers guaranteed that the service provider will be available. Further, Internet searching is steadily replacing traditional yellow pages searches by consumers.

1-900 phone systems do enable service providers to charge for their services on a time-elapsed model. However, 1-900 systems also are not able to take advantage of the massive trend of consumers increasingly using the Internet to search for what they want and need, including advice on various topics. Further, single 1-900 numbers have restricted scope and flexibility with regard to service and price, as well as limited consumer trust with regards to billing and quality of service provided.

Currently, there are systems available that facilitate the delivery of advice to consumers in real-time via the Internet utilizing telecommunications systems. However, such systems have created such a massive directory with thousands upon thousands of individual listings in any given category that it has become overwhelming for consumers to determine their choice. Likewise, it has become near impossible for the large majority of individual service providers to attract any interested consumers, as the rigid nature of the directory listing system allows extremely limited opportunities for a particular service provider to differentiate their service among the thousands of others in the same list.

Consequently, there is a need for a system to enable the provision of advice service through both the Internet and telecommunications that can overcome all of the limitations described above. Such a system, which empowers and utilizes independent Agents within its inventive framework and creative methods, is hereinafter described.

DEFINITIONS

Agent: one who integrates and employs the System within their websites or other Internet-based displayed and/or published materials offering a unique, differentiated grouping of Service Providers who collectively employ the System.

Browser: a software program that runs on a client host and is used to request Web pages and other data from server hosts. This data can be downloaded to the client's disk or displayed on the screen by the browser.

Chat: real-time, synchronous, text-based communication via computer.

Client host: a computer that requests Web pages from server hosts, and generally communicates through a browser program.

Content provider: a person responsible for providing the information that makes up a collection of Web pages.

Electronic notification: any automated communication received by e-mail, phone, fax, text message, SMS, RSS or any third party software notification or alerting system.

Embedded client software programs: software programs that comprise part of a Web site and that get downloaded into, and executed by, the browser.

Host: a computer that is connected to a network such as the Internet. Every host has a hostname (e.g., mypc.mycompany.com) and a numeric IP address (e.g., 123.104.35.12).

HTML (HyperText Markup Language): the language used to author Web Pages. In its raw form, HTML looks like normal text, interspersed with formatting commands. A browser's primary function is to read and render HTML.

HTTP (HyperText Transfer Protocol): protocol used between a browser and a Web server to exchange Web pages and other data over the Internet.

HyperText: text annotated with links to other Web pages (e.g., HTML).

Internet-Based Icon: a graphical or text icon that is linked to this system's database and enables the initiation of contact between the Service Provider and the consumer, which is located anywhere throughout the Internet including but not limited to websites, emails, directory listings, and advertisement banners IP (Internet Protocol): the communication protocol governing the Internet.

Server host: a computer on the Internet that hands out Web pages through a Web server program.

Service Provider: one who is providing advice through this system to Users or consumers. Also known as an Expert or an Advisor.

URL (Uniform Resource Locator): the address of a Web component or other data. The URL identifies the protocol used to communicate with the server host, the IP address of the server host, and the location of the requested data on the server host.

User: one who is seeking advice services from expert Service Providers through this system. Also known as a Consumer or Customer.

UWU server: in connection with the present invention, a special Web server in charge of distributing statistics describing Web traffic.

Visit: a series of requests to a fixed Web server by a single person (through a browser), occurring contiguously in time.

Web master: the (typically technically trained) person in charge of keeping a host server and Web server program running.

Web page: multimedia information on a Web site. A Web page is typically an HTML document comprising other Web components, such as images.

Web server: a software program running on a server host, for handing out Web pages.

Web site: a collection of Web pages residing on one or multiple server hosts and accessible through the same hostname (such as, for example, www.lucent.com).

SUMMARY OF THE INVENTION

The current invention utilizes the Internet. The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that affects the requesting of Web pages and the displaying of Web pages.

It is the objective of the current invention to provide a system and methods for managing, supporting and empowering independent Agents to offer a unique platform around a standard apparatus for enabling expert Service Providers to deliver, and charge for, advice to consumers, by connecting two parties in real time in an online chat. The present invention remedies the shortcomings of the prior art by enabling group Agents to integrate the system into their own specialized websites, thereby allowing a much greater expression of differentiation for Service Providers and more focused, comprehensible listings for consumers.

The present invention provides the method and techniques to empower expert Service Providers, in turn, to provide their service through an unlimited number of independent Agent channels without potential communication device conflict, thereby maintaining both service provider and consumer satisfaction.

The benefits of this invention include the facilitation of real-time communication between a Consumer and Service Provider of advice, the management of the accounting system for Consumer, Agent and Service Provider, the empowerment of Agents to develop their own customized website that integrates and utilizes the system thereby offering Consumers more focused and differentiated choice online, and the ability for Service Providers to offer their expert services via multiple accounts to numerous independent Agents by eliminating any potential for telecommunication device conflict.

The system provides a more efficient practical and functional method to enable Users to contact Service Providers for expert advice and Service Providers to promote and offer their services to and transact their services with consumers than the current art.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 2 shows the systems main login web page;

FIG. 5 shows a popup displaying the chat-time time clock;

FIG. 6 displays a popup displaying a User's allotted chat-time;

FIG. 8 User Chat Service Search for Service Provider Links Search Result is shown;

FIG. 12 displays User's usage information;

FIG. 16 displays an Agent-specific Advisors Information and Management Page;

FIG. 18 displays an accounting summary screen for an Service Provider's Transactions page;

FIG. 19 displays an accounting summary screen for a User's Member Transactions page;

FIG. 20 shows the Service Provider Profile in Member Area;

FIG. 21 displays a Chat Usage Transaction for an Agent page associated with an Agent;

FIG. 25 shows a Chat Finished Screen;

FIG. 26 shows a Chat Back Request;

FIG. 28 shows the Chat back Requests Member Interface;

FIG. 29 shows the Service Provider Member Chat Back Request review screen; and FIG. 30 shows a Default Member login page Users Service Provider List.

DETAILED DESCRIPTION OF THE INVENTION

The following description is demonstrative in nature and is not intended to limit the scope of the invention or its application of uses. There are a number of significant design features and improvements incorporated within the invention. The current invention is a system that will allow Users to contact Service Providers in specific fields. The Users will choose a Service Provider to contact. Once a Service Provider is chosen, a pop-up window will appear telling that User, among other things, if the Service Provider is available or not. If the Service Provider is available, the system will connect the User with the Service Provider upon a user Initiated Chat Invitation Request. If the service provider is unavailable the system will allow the User to schedule a chat or submit a chat back request, which then creates an email notification to the Service Provider notifying the Service Provider a User would like to chat.

The system provides techniques for managing, supporting and empowering Independent Agents to offer a method for enabling expert Service Providers to deliver, and charge for, advice to consumers, by connecting two parties in real time in an online chat. Further, the present invention provides the method and techniques for expert Service Providers, in turn, to provide their service through a multiplicity of Independent Agent channels without potential communication device conflict for consumers.

The computer application that includes the User interface for this invention will henceforth be referred to as "the System" 1. The system 1 is network based and works on an Internet, Intranet and/or Wireless network.

Figure 1:
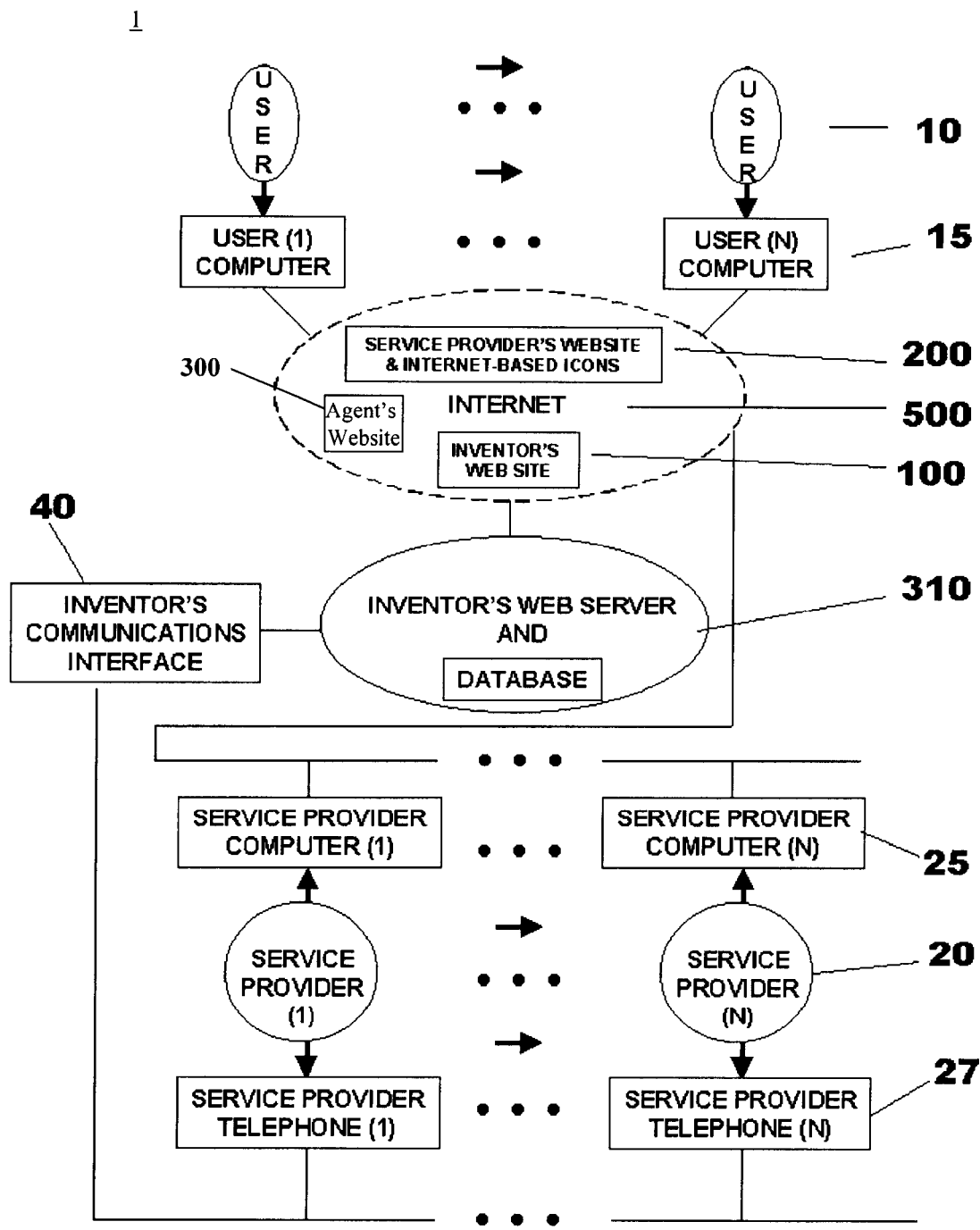
FIG. 1 shows an overview of how a User accesses the system through the Internet.

FIG. 1 illustrates a functional diagram of a computer network for World Wide Web 500 access to the System 1 from a plurality of Users 10 who access the System Web Server and Database 310 via the System Web Site 100, independent Agent integrator Websites, and/or a plurality of Service Provider Websites and Internet-based Icons 200 from the Users' Computers 15 and Telephones 27. Accessing the System Web Site 100, the Agent websites 300 or the Service Provider Websites and Internet-based Icons 200 can be accomplished directly through a communication means such as a direct connection, an intranet, a local Internet Service Provider, often referred to as ISPs, or through an on-line Service Provider like AT&T or VERIZON.

The Users 10 contact the System Web Server and Database 310 via the System Web Site 100, the Agent website 300 or the Service Provider Websites and Internet-base Icons 200 using an informational processing system (Client) capable of running an HTML compliant Web browser such as MICROSOFT'S INTERNET EXPLORER, NETSCAPE NAVIGATOR and MOSAIC. A typical system that is used is a personal computer with an operating system such as MAC, LINUX or WINDOWS or XP, NT, or VISTA, running a Web browser. The exact hardware configuration of computer used by the Users 10, the brand of operating system or the brand of Web browser configuration is unimportant to understand this present invention. Those skilled in the art can conclude that any HTML (Hyper Text Markup Language) compatible Web browser is within the true spirit of this invention and the scope of the claims.

In one preferred embodiment of the invention, the Users 10, Agents and Service Providers 20 can connect to the System Web Site 100 via the Internet 500 using their respective Computers 15 and 25 to register their accounts. In the preferred embodiment the system has numerous web pages. The information in the web pages is in HTML format via the HyperText Transport Protocol (http) and on Server System 310. The User System 310 allows the viewing of web pages and the inputting of User 10, Agent and Service Provider 20 information to be stored in the System Database 310, through commonly used software referred to as a Web Browser, such as COMMUNICATOR available from NETSCAPE COMMUNICATIONS CORP. or INTERNET EXPLORER available from MICROSOFT CORP. The system is capable of accessing web pages located on Server System 310.

The System Database 310 provides the ability to allow Agents and Service Providers 20 to embed Internet-based Icons within their websites, emails and online advertising banners that are empowered to access the System Web Server Database 310. From these websites and Internet-Based Icons, Users 10 are enabled to contact the Agents' Service Providers or independent Service Providers 20.

The System 1 will connect the User 10 and the Service Provider 20 using a communication interface 40. In the preferred embodiment, once a User 10 decides on a Service Provider 20, the communication interface 40 will call both the User 10 and the Service Provider 20 to connect them so that the Service Provider 20 can assist the User 10. The communication interface 40 will create a chat session over the Internet.

Figure 2:
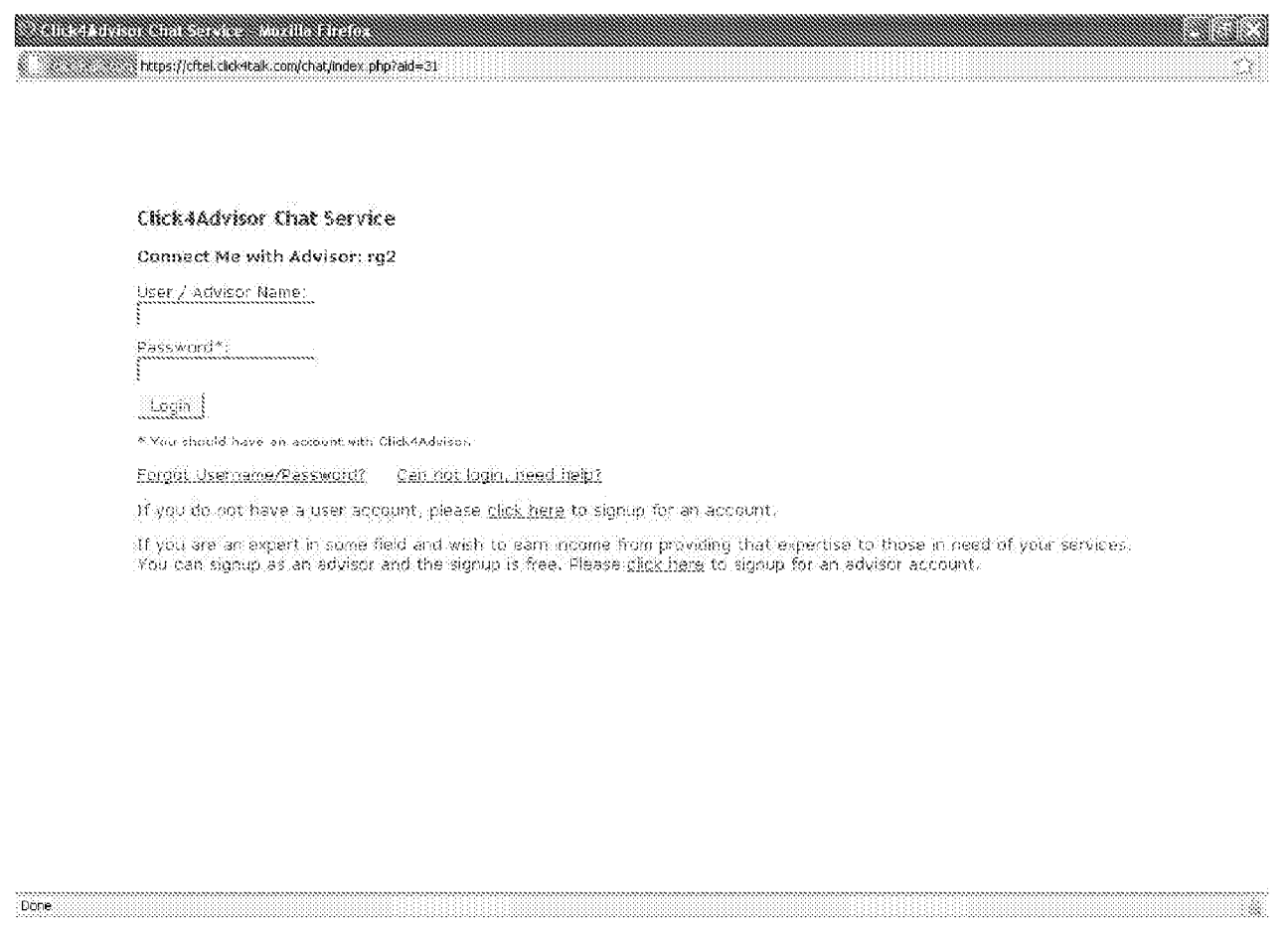

In one preferred embodiment of the invention, the Users 10 connect to the Web site 100. The system 1 would have a standard home web page as shown in FIG. 2. This home web page would have information about the system 1. The main web page in the preferred embodiment would also have an icon that a User 10 would click for a demonstration of the system 1 as well as hypertexts to help and information web pages. The main web page would also include icons that would transfer a User 10 to User Information, Service Provider Information, Agent Information, User Registration, Service Provider Registration, About Us, News and Contact Us web pages. The home web page would also have hypertext to the standard home, legal notices, copyright notices, Privacy Policy, User Agreement, Service Provider Agreement and Contact Us web pages.

Figure 3:
FIG. 3 shows the listing of Service Providers.
Figure 7:
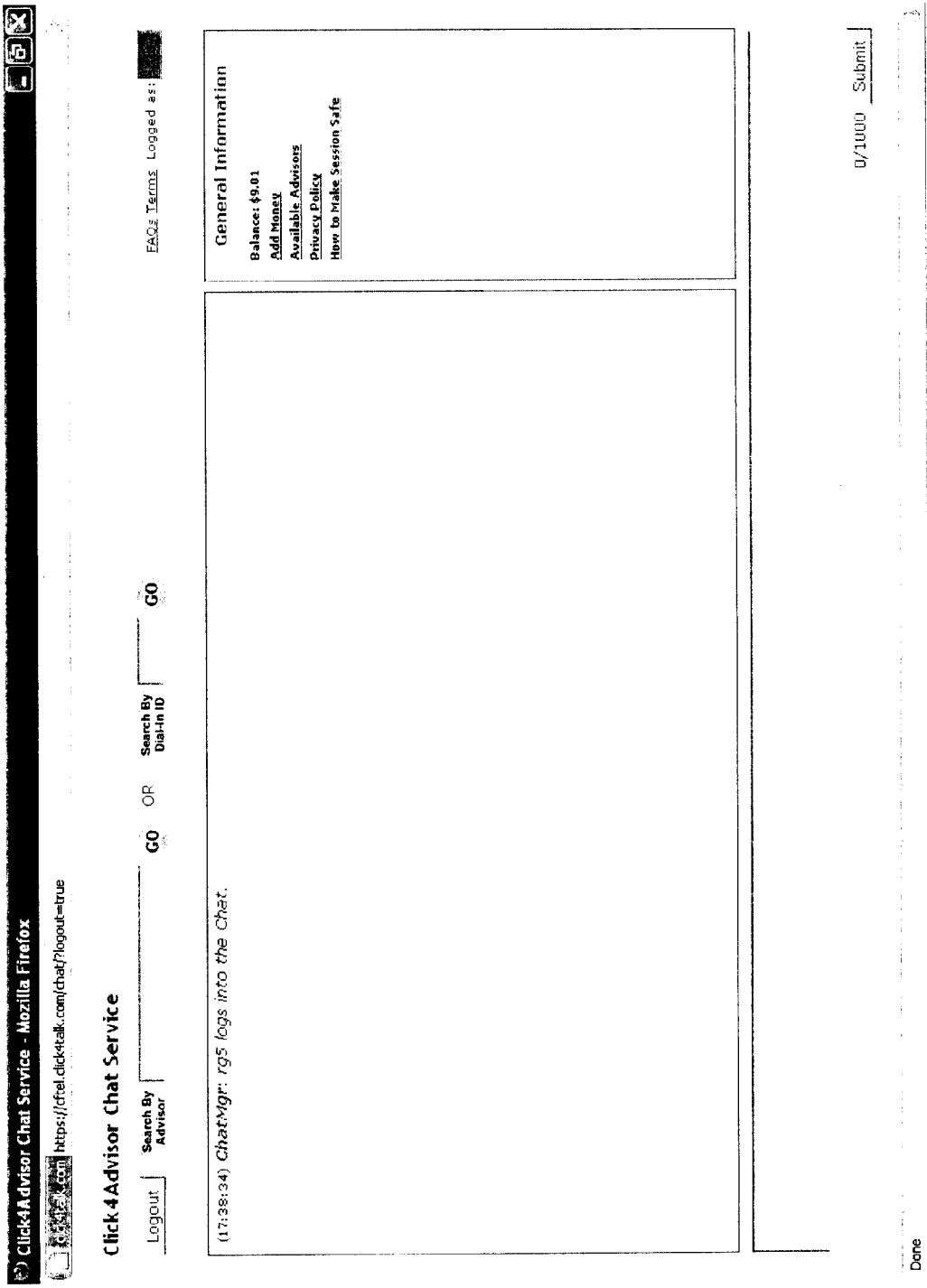
FIG. 7 User Chat Service Search for Service Provider Links is shown.

In the preferred embodiment of the System 1, an Agent of the System 1 will provide an industry-specific Internet-based Agent directory website 300, like the example in FIG. 3, where a User 10 can locate and choose from multiple Service Providers 20. If User 10 chooses to use a specific Service Provider he/she will use the curser to click the connect icon. Alternatively, a User 10 can search an Agent's database for a Service Provider by name or dial-In ID number as shown in FIGS. 7 and 8.

Figure 4A:
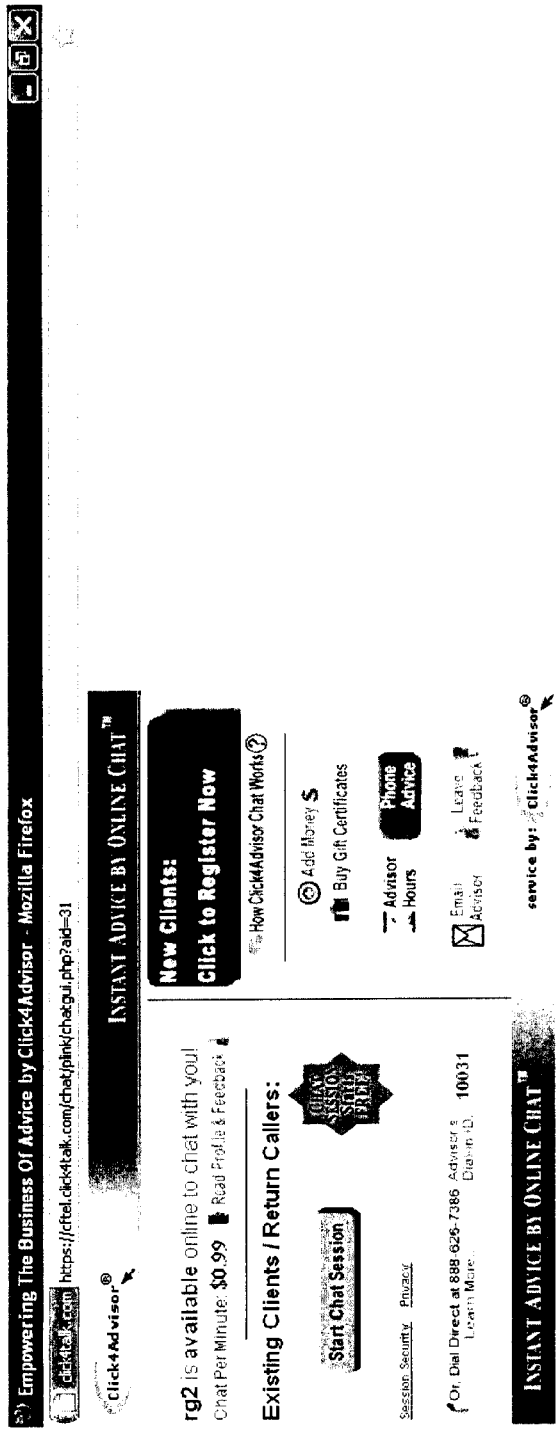
FIGS. 4*a* and 4*b* displays a popup displaying the Service Provider's status.
Figure 4B:
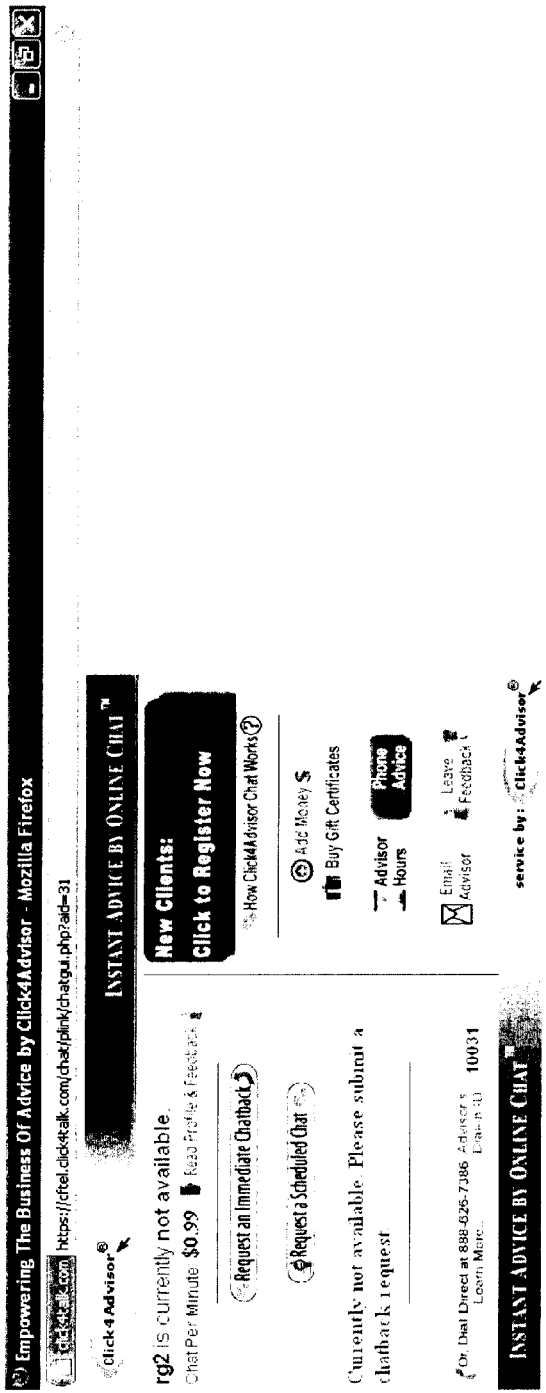
Figure 22:
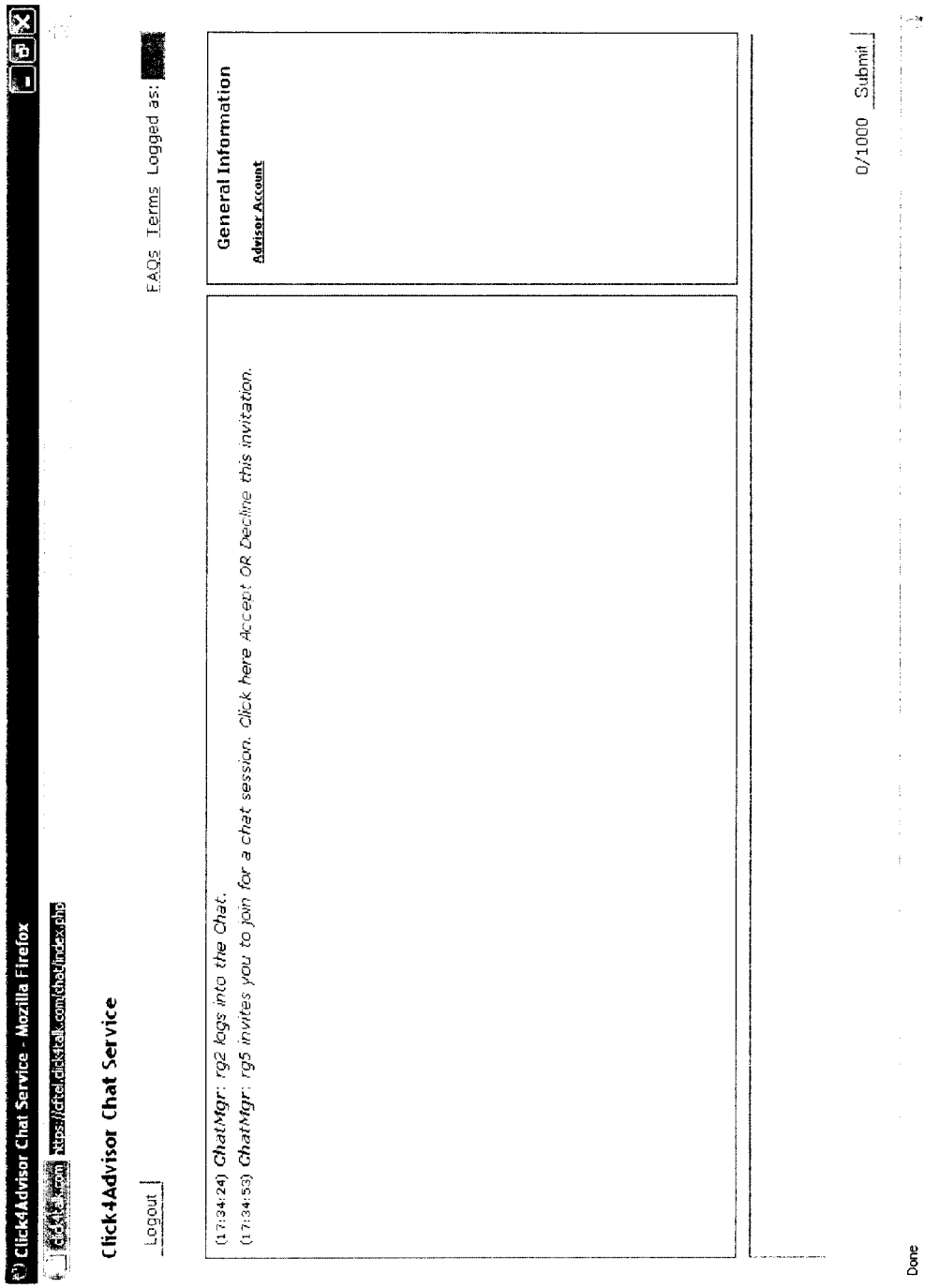
FIG. 22 shows and Service Provider Receiving Invite in Chat Screen.

The connect icon will bring up a popup window as shown in FIGS. 4a and 4b. This popup window will display the Service Provider's system ID name, their rate of compensation, a hypertext link to a summary about the Service Provider that includes feedback from previous Users, various other hypertext links to policies, new User Registration, and descriptions of how the System 1 works, as well as text boxes for Users 10 to enter their System ID and Password and telephone number, and whether or not the Service Provider is available. If available as shown in FIG. 4a, the User 10 can send chat invitation request. If unavailable as shown in FIG. 4b, the User 10 can submit an immediate chat back request or send a request to schedule a chat by selecting the appropriate icon. If a chat invitation request is requested by a User and accepted by the Service Provider, the system will then contact the User 10 and the Service Provider by opening an online chat session. FIG. 22 shows a Service Provider 20 receiving a invitation to accept a chat request.

The system 1 will also allow the User 10 to click on hypertext link in an Agent's web property 300 and view a quick list to check the availability status of all the Agent's Service Providers 20.

Figure 9:
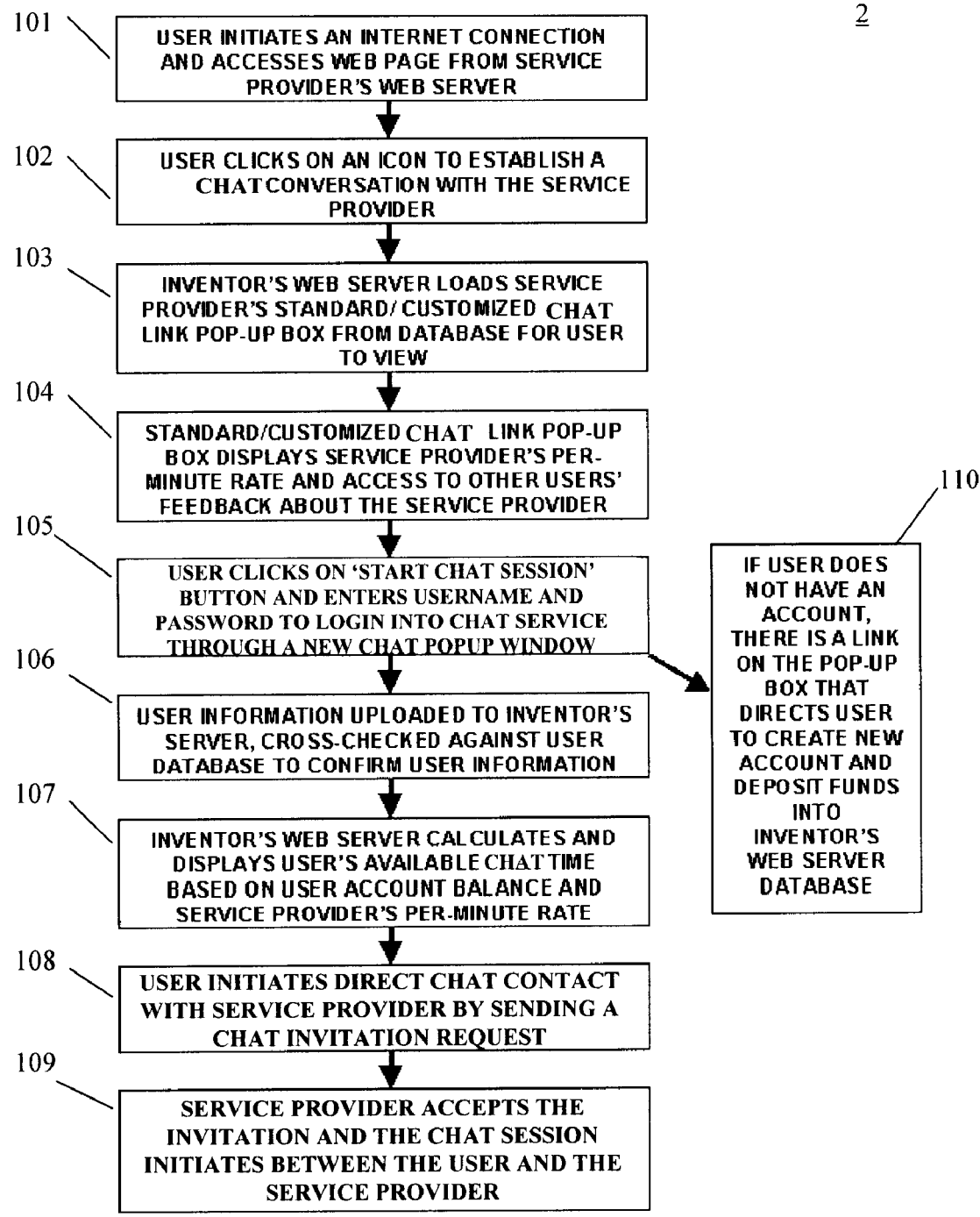
FIGS. 9 and 10 show the flowchart if a Service Provider is available.
Figure 10:
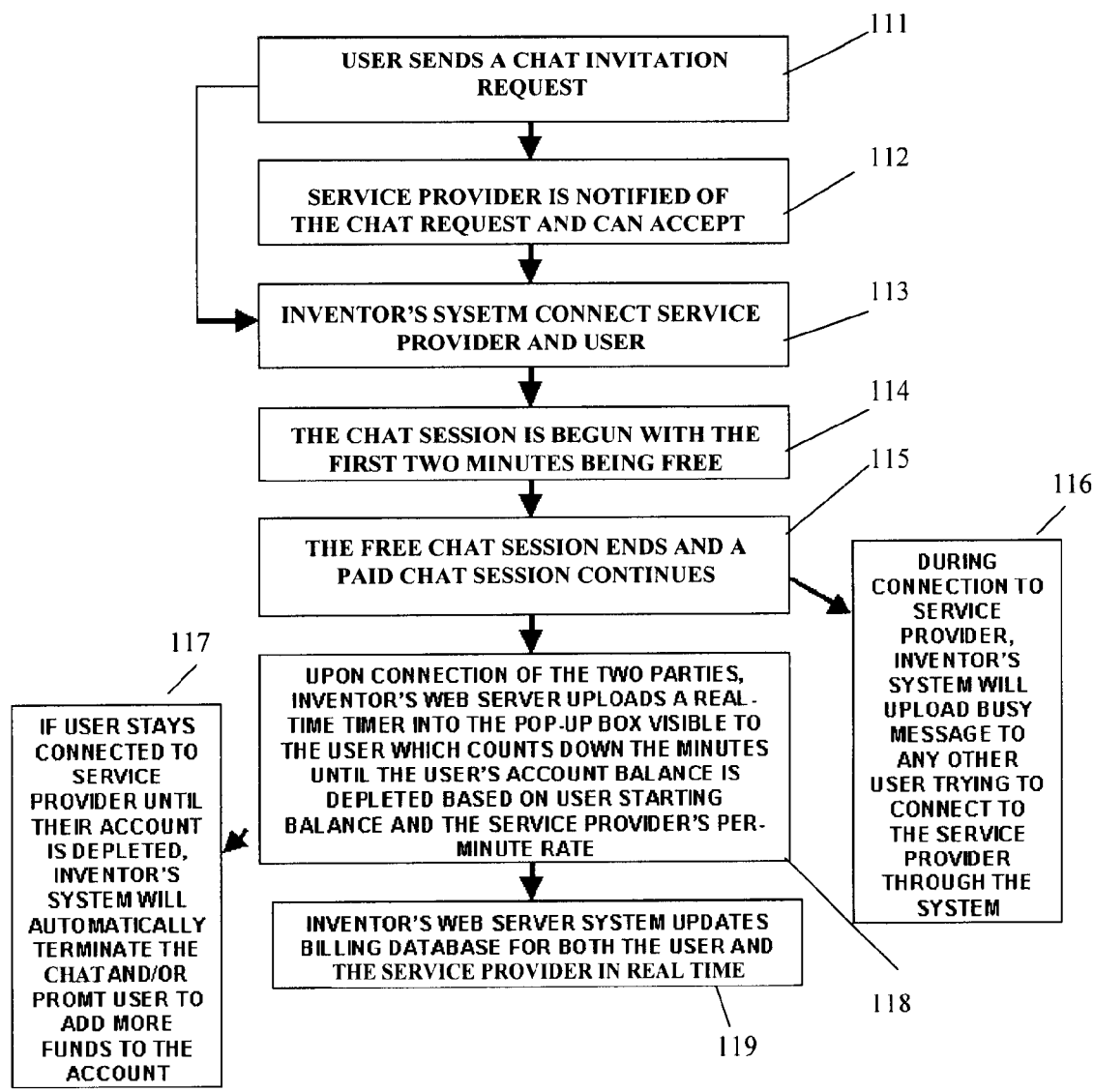

FIG. 9 display a system flowchart 2 of what happens if a Service Provider 20 is Available and a chat back request is sent from a User 10 to a Service Provider 20. First the User 10 initiates an Internet connection and accesses the Agent's website 300 or an the independent Service Provider's web page or other web presence 200 from a web server in step 101. Next the User 10 clicks on an icon to initiate the establishment of an online chat conversation with the Service Provider in step 102. The system's web server 310 loads Service Provider's standard/customized link pop-up box from system database 310 for the User 10 to view in step 103. The standard/customized chat link pop-up window displays the Service Provider's system name, per-minute rate, availability message and access to system email service and to other Users' feedback about the Service Provider in step 104. The User clicks on 'Start Chat Session" button and the new pop-up window prompts User to enter ID and password to log into chat service in step 105. If User 10 does not have an account, there is a link on the pop-up window that directs User 10 to create a new account and deposit funds into the system's web server database 310 in step 110. The User information is uploaded to the system and crosschecked against the User database to confirm User information in step 106. The system's web server 310 then calculates and displays, as shown in FIGS. 5 and 6, in the chat session pop-up window the User's available talk time based on User account balance and Service Provider's per-minute rate in step 107. The User 10 initiates a direct online chat with the Service Provider 20 by sending a chat invitation request in step 108. The Service Provider accepts the chat invitation and the chat session initiates between the User and the Service Provider by the system's Communications Interface 40 in step 109.

During the connection to the Service Provider 20, the system 1 will upload a busy message into the pop-up window to any other User 10 trying to connect to the Service Provider 20 through the system 1. Furthermore, the system 1 will upload a busy message into the pop-up window to display to any other User 10 trying to connect to all other Service Provider accounts, either associated with other Agent groups or independent.

Figure 23:
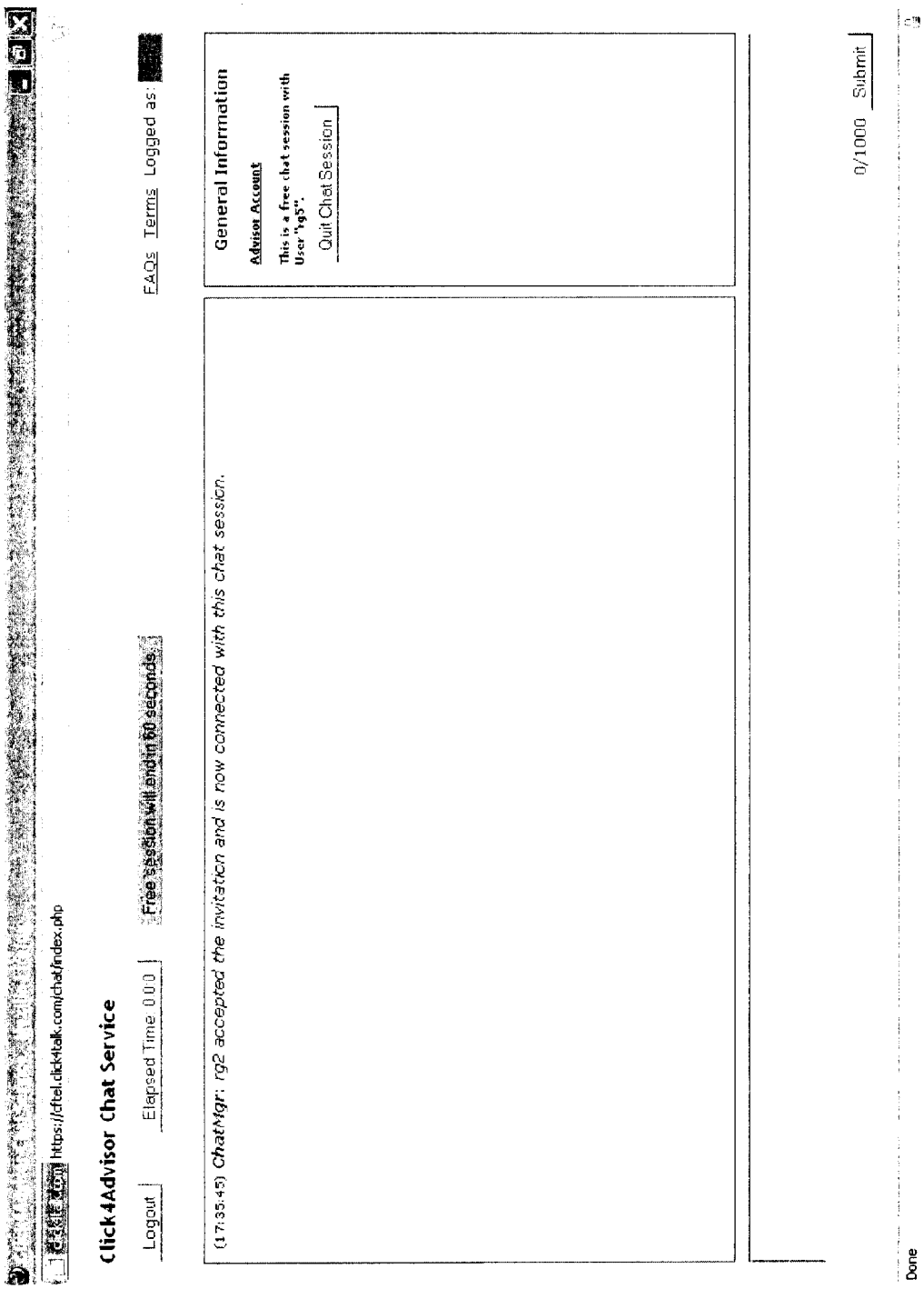
FIG. 23 shows an Service Provider Chat where the invitation is accepted and chat had begun free.
Figure 24:
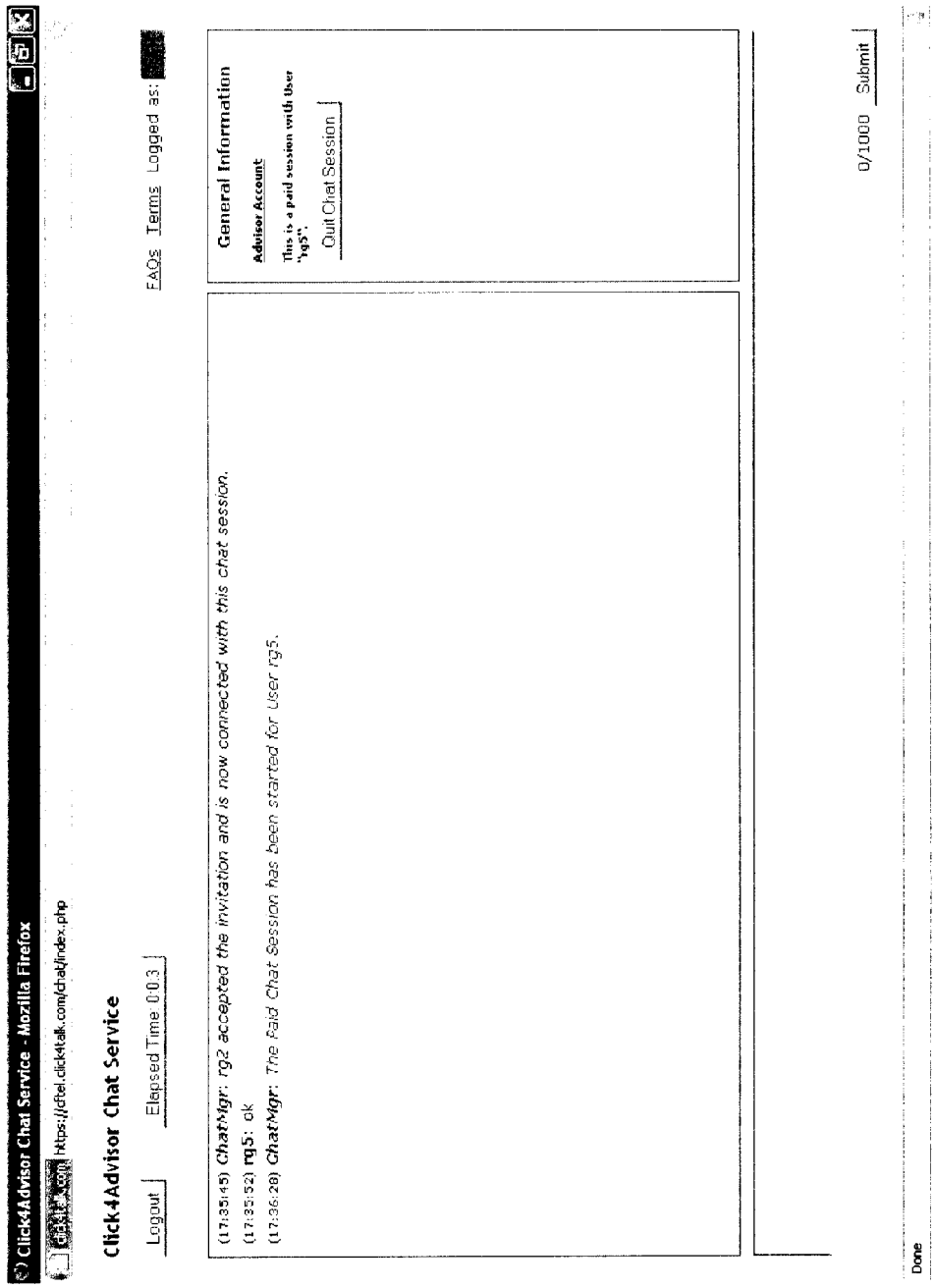
FIG. 24 shows an Service Provider Chat where the invitation is accepted and the paid chat has begun.
Figure 27:
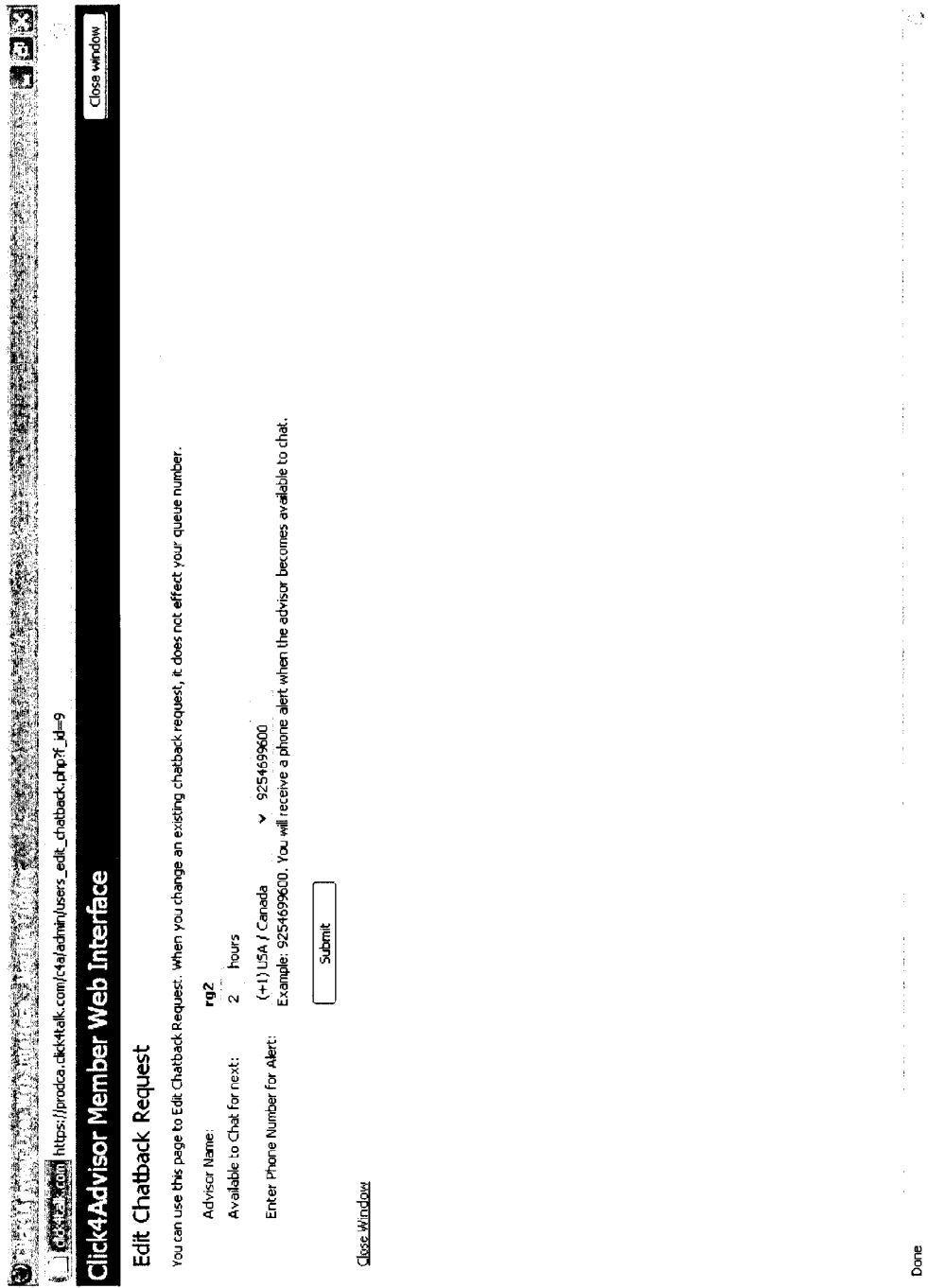
FIG. 27 shows a the Users interface to Edit a Chat back Request.

After a user submits a chat request 111, illustrated in FIGS. 26 and 27, a Service Provider is then notified 112 and accepts the request 112 and the parties are connected 113. The chat session is begun with the first two minutes, or any other predetermined time period, as a free, uncharged, chat session in step 114 and shown in FIG. 23. At the end of the time period, the free, uncharged chat session ends and a paid session seamlessly continues the chat in step 115 illustrated in FIG. 24. Upon connection of the two parties, the system 1 uploads a real-time timer into the pop-up window, as shown in FIG. 5, visible to the User 10 which counts down the minutes until the User's account balance is depleted based on User 10 starting balance and the Service Provider's per-minute rate in step 118. If the User 10 stays connected to Service Provider 20 until their account is depleted, the system 1 will automatically terminate the chat session and/or prompt User to add more funds to the account in step 117. The system 1 updates the billing database for both the User 10, the Agent and the Service Provider 20 in real time upon the termination of a chat session in step 119 and illustrated in FIG. 25. During connection to a Service Provider, inventor's system will upload a busy message to any other user trying to connect to the service provider through the system in step 116.

Figure 11:
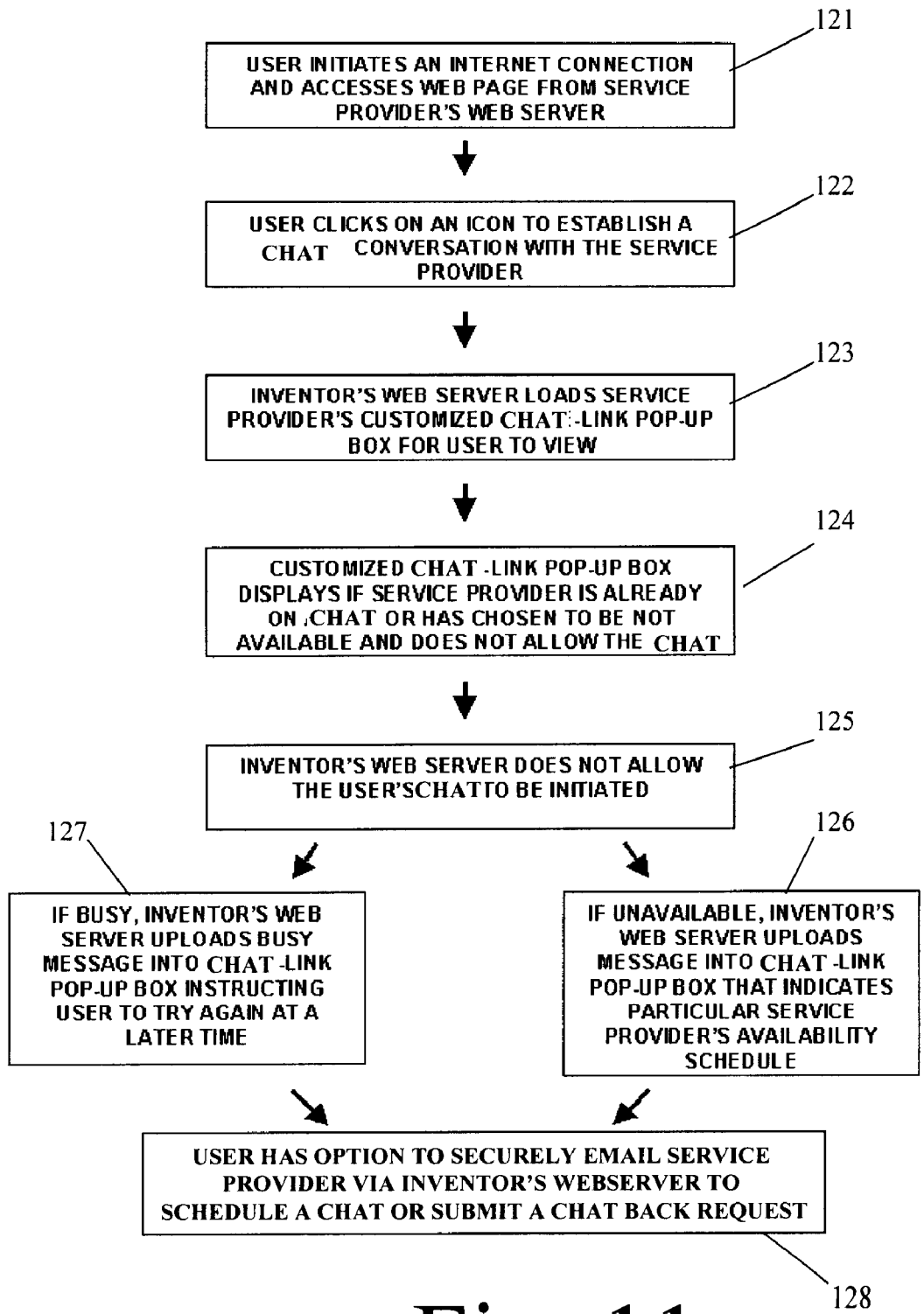
FIG. 11 shows the flowchart if a Service Provider is unavailable.

FIG. 11 displays a system flowchart of how the system 1 processes when a Service Provider 20 is Not Available. First, the User 10 initiates an Internet connection and accesses the Agent's website 300 or the Service Provider's web page or other web presence 200 from the a web server in step 121. Next, the User 10 clicks on an icon to establish an online chat with the Service Provider 20 in step 122. The system 1 loads the Service Provider's standard/customized chat-link pop-up window from the system web server database 310 for User 10 to view in step 123. The system 1 checks the web server database 310 to determine whether the Service Provider 20 has pre-determined to be Not Available at this time and then with the communication interface 40 to determine if Service Provider 20 is already in a chat or otherwise unavailable in step 124. If either is the case, the system 1 does not allow the communications interface 40 to initiate the User's intended chat in step 125. Additionally, the web server 310 generates and displays in the standard/customized pop-up window that the Service Provider 20 is unavailable or has chosen to be Not Available at this time and that the User may Submit a Chat Request in step 127 or try again at a later time in step 126. The User 10 will then have the option to privately and securely submit a chat request to the Service Provider 20 via the system 1 to arrange an appointment in step 128.

Figure 12:
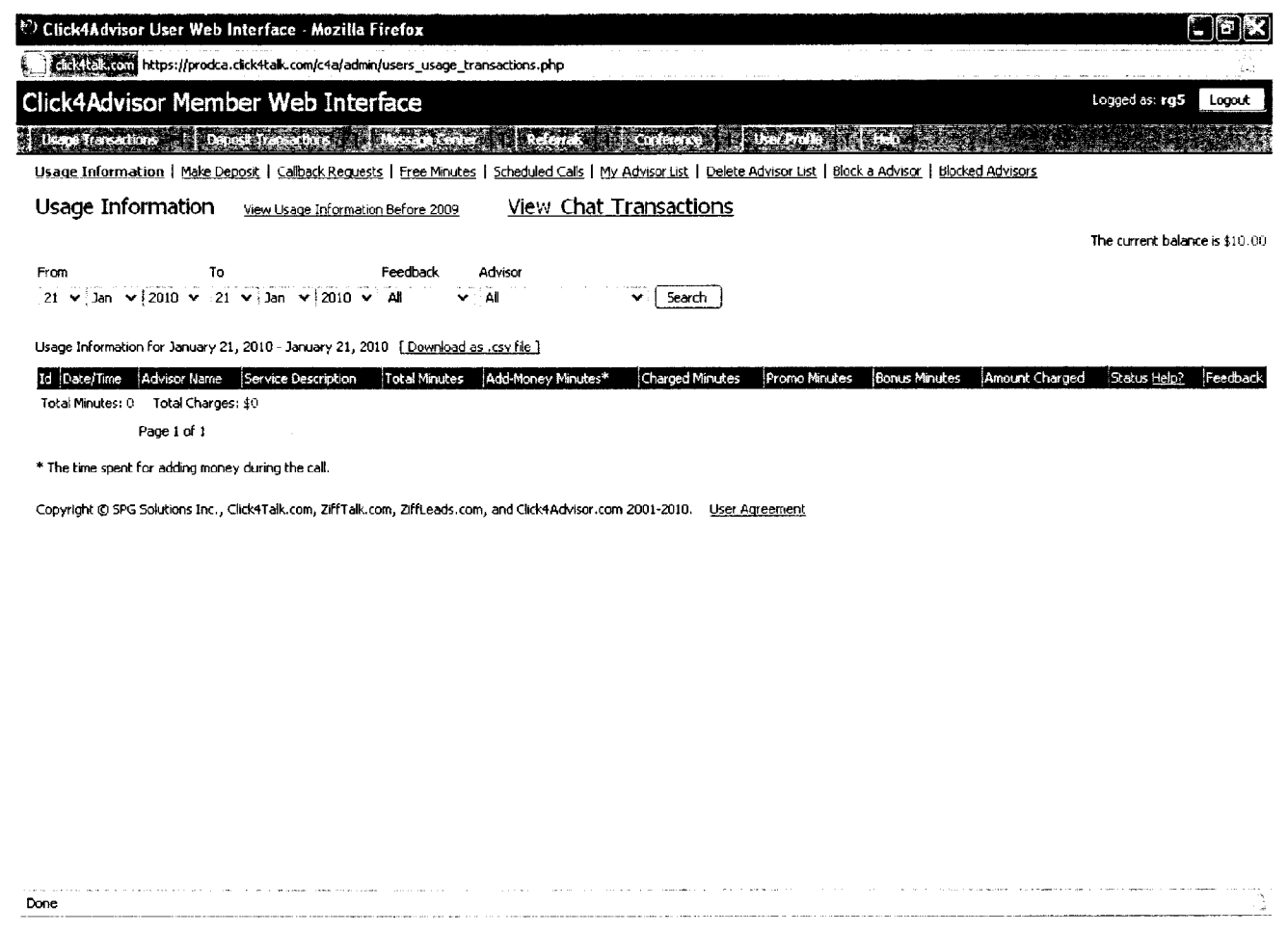
Figure 13:
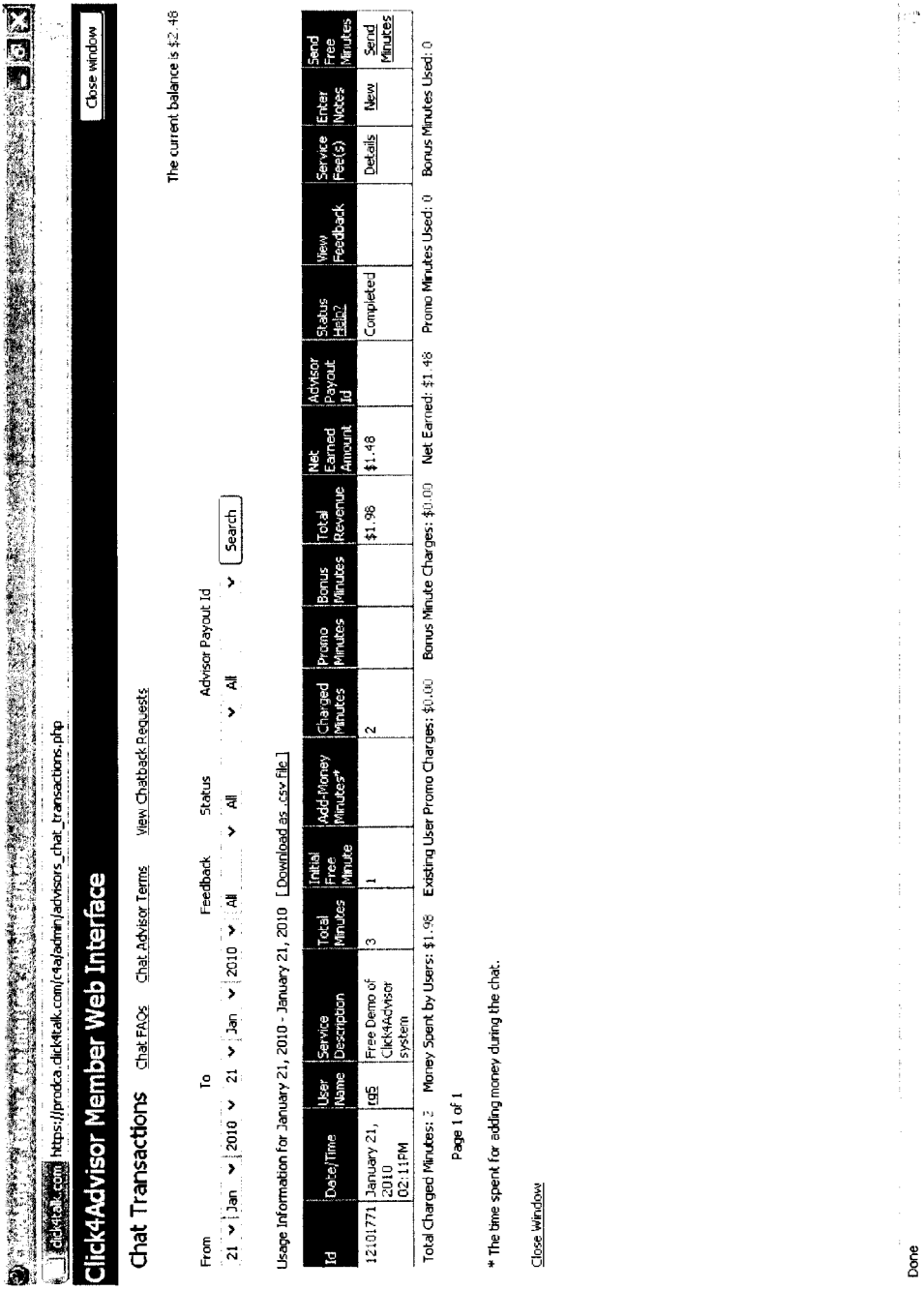
FIG. 13 displays Service Provider's usage information.

FIGS. 12 and 13 displays User 10 usage information from within the User management interface. The site 100 will ask for the Users 10 to enter their system name and password to access their account's User management interface. The system 1 will display this information to assist and inform the User 10. The web page will have the date/time, adviser's name and service description, chat duration, amount charged, the status, feedback and details. This information, along with many other account management functions within the User management interface, is used by the User 10 to manage his or her account. User-initiated deposits from the interface to the account of the User 10 initially and continually fund the account.

The system 1 will also create a feedback system for the Users 10 to reference based on a history of past feedback information on Service Providers 20 by other Users 10. The User 10 will give feedback to the system 1 regarding the Service Provider 20 based on the service provided. The system 1 will prompt a User 10 provide such feedback.

Figure 14:
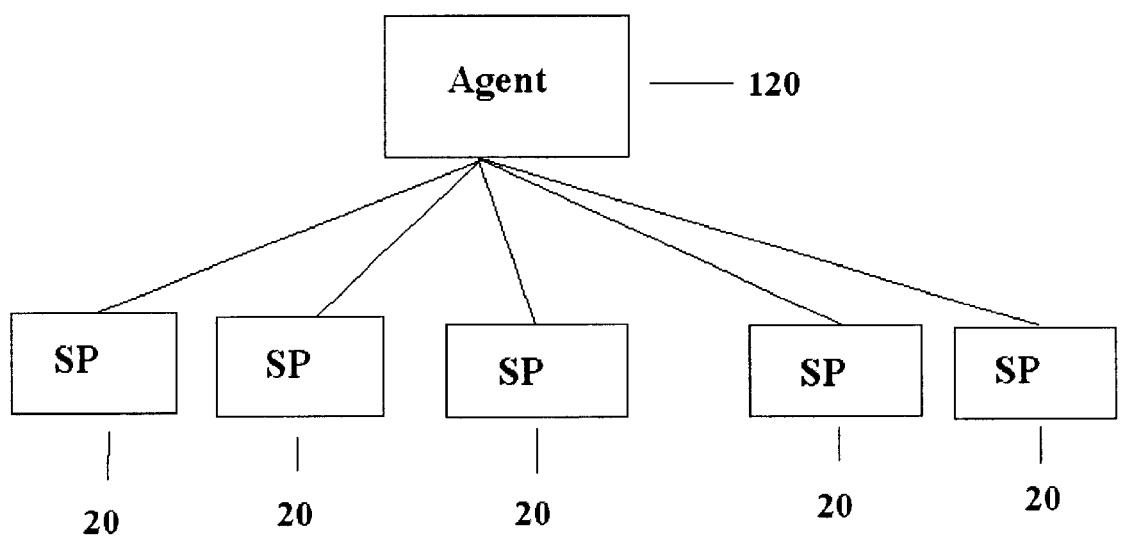
FIG. 14 displays the association of multiple Service Providers with an Agent.
Figure 15:
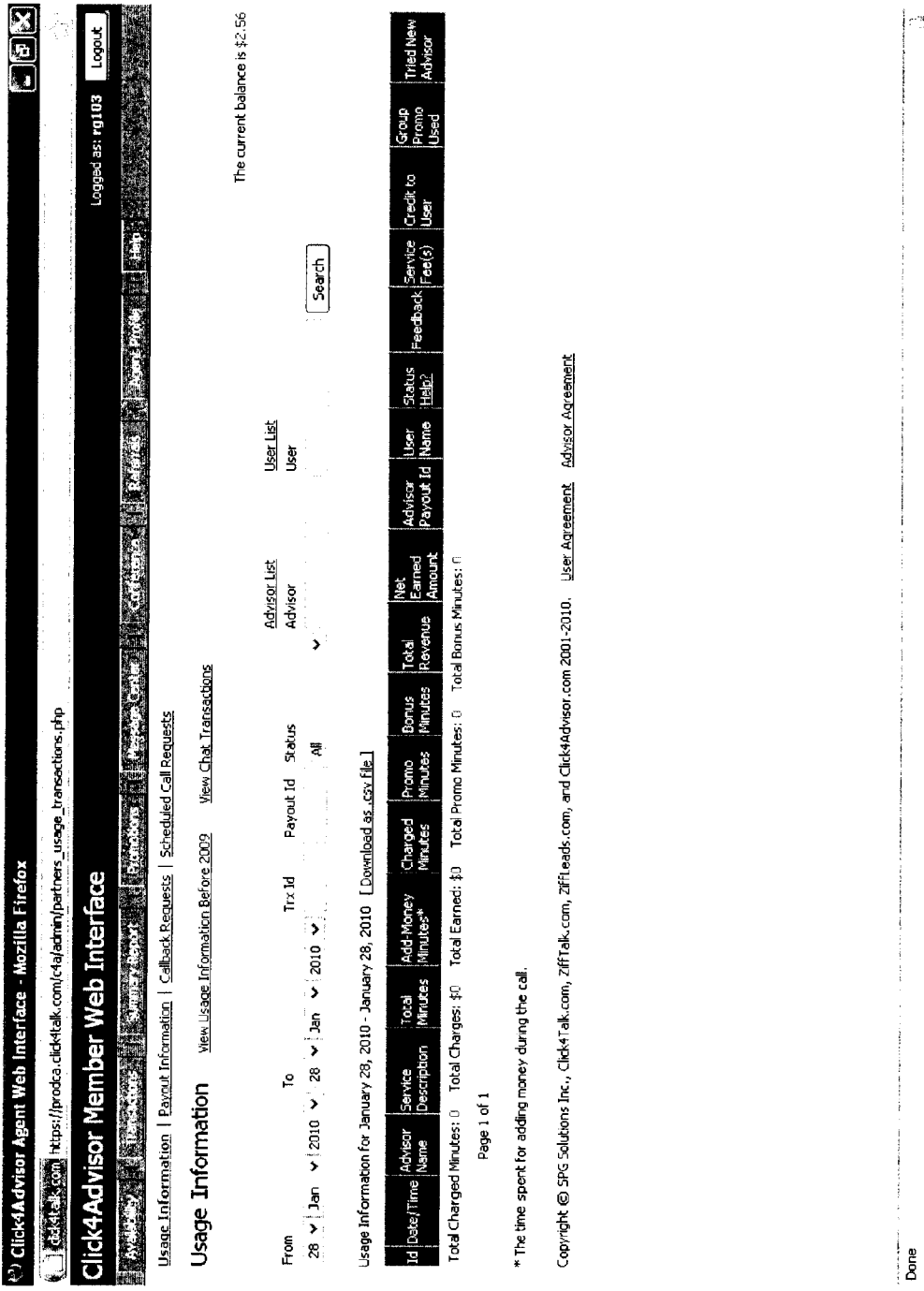
FIG. 15 displays a summary page associated with an Agent.
Figure 17:
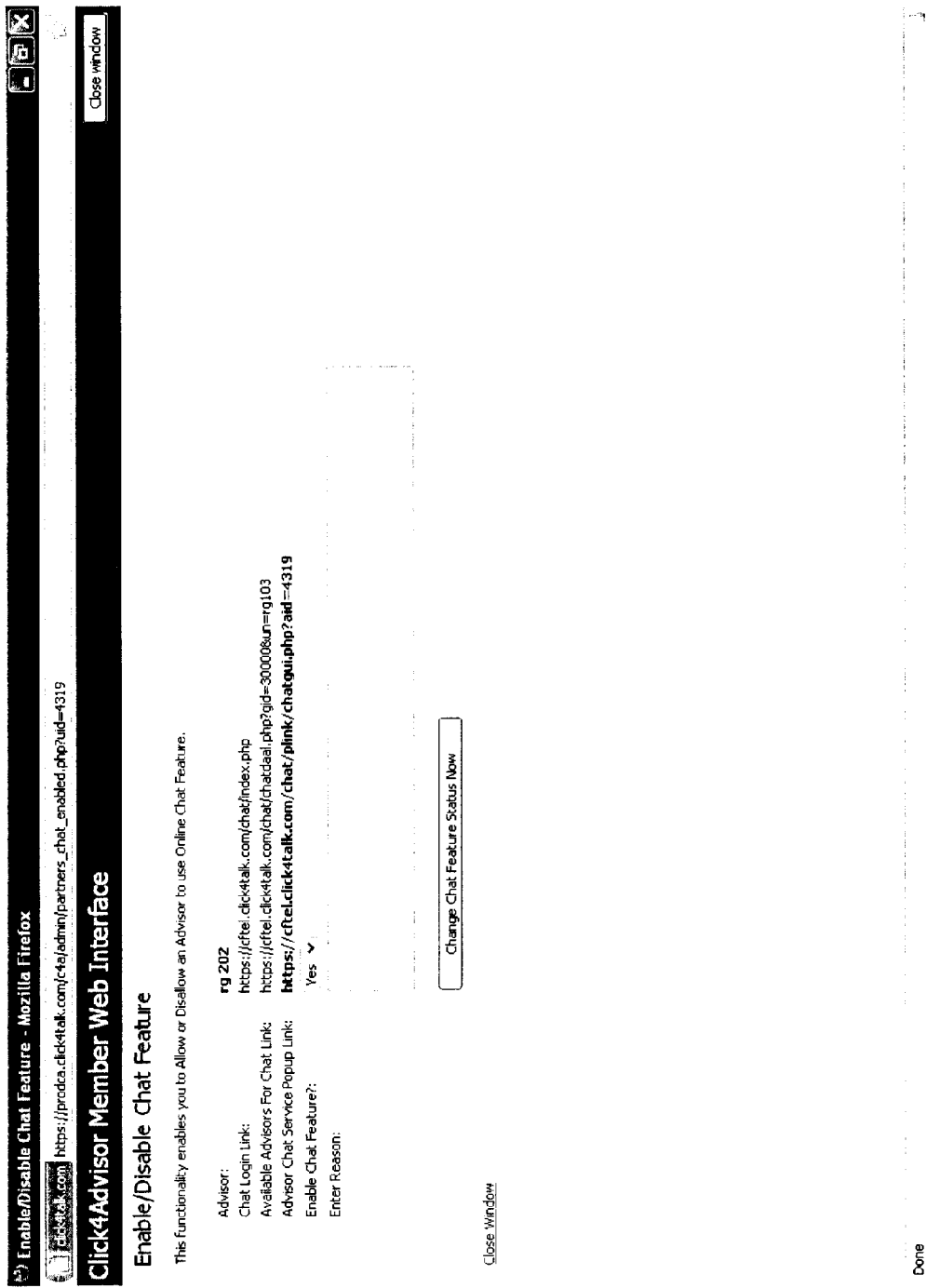
FIG. 17 displays an Agent-specific window for enabling/disabling the chat feature for an Advisor.
Figure 21:
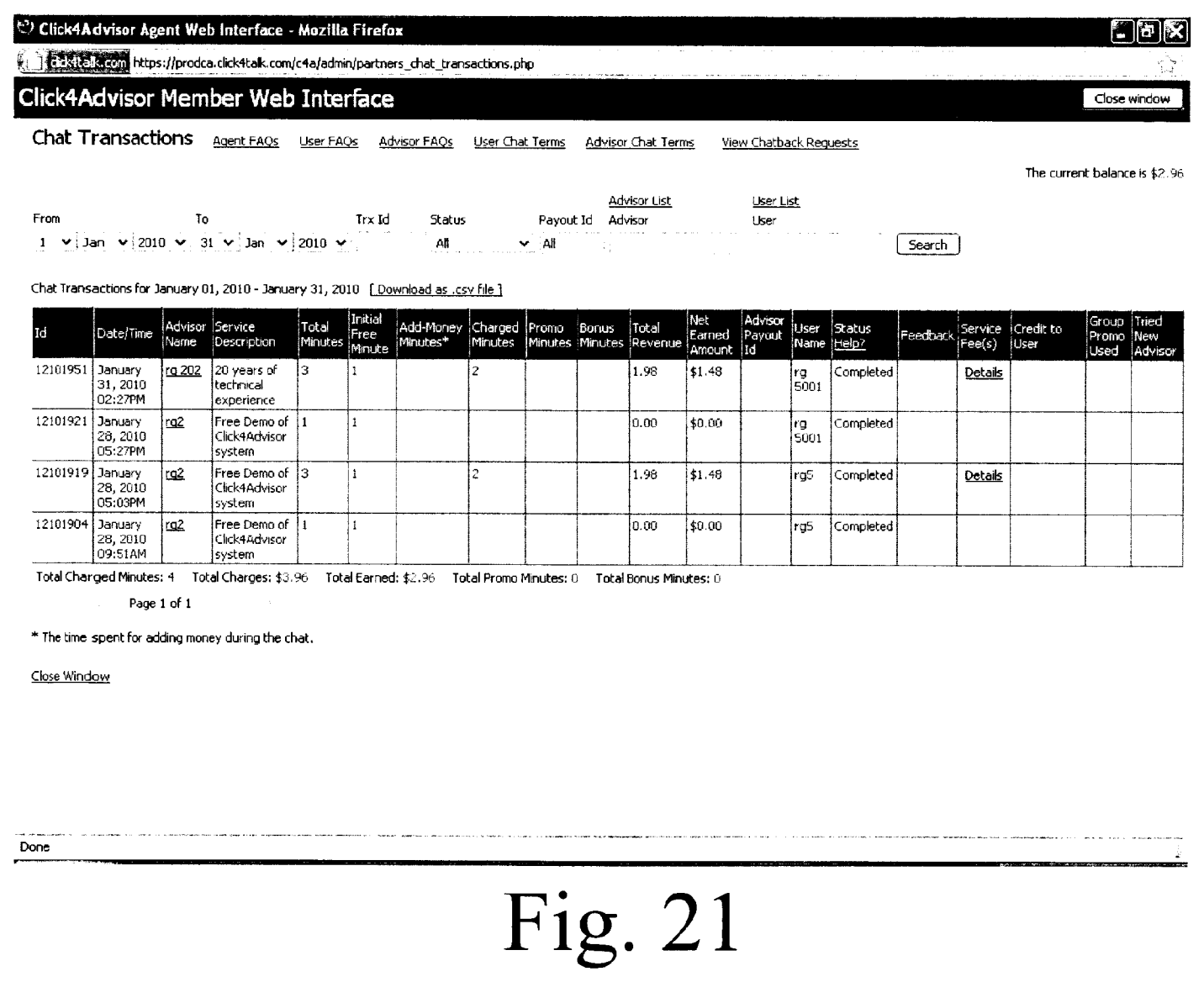

The system 1 will assign an Agent ID number to the Agent account. The expert Service Provider 20 will enter the appropriate Agent ID when registering as a new Service Provider 20 with the particular Agent in order to be displayed on the Agent's web site 300. As shown in FIG. 14, the system 1 will link all Service Providers 20 registered under a single Agent ID into one account information and transaction activity management interface: the Agent management interface. The system 1 will automatically distribute the appropriate service HTML code to the Agent for each newly registered Service Provider 20 thereby; enabling the Agent to readily create their own Internet-based collection of specialized Service Providers 20 and in turn, connect Users 10 with these Service Providers 20 for expert advice in real time via either a telephone connection or online chat service. FIGS. 15, 16, and 21 display a sample function of the system's 1 Agent management screen interface. As shown in FIGS. 15 and 21, Usage Information, the screen will have a transaction ID, the date and time of the transaction, service description, charged minutes, promo minutes, total revenue per transaction, Net earned amount, advisor payout ID, User name, status of transaction, service fee details and credit to user field that will be displayed. The screen will have selection criteria for the records to display. This criterion includes from and to dates, advisor payout ID, Service Provider and User. Additionally, an Agent can individually enable or disable a Service Provider as shown in FIG. 17. FIG. 21 displays a Chat Usage Transaction for an Agent page associated with an Agent.

The system 1 monitors how long chat connections are maintained between the Users 10 and the Service Providers 20. The system 1 will assist Agents who have multiple Service Providers 20 manage their transactions.

Figure 18:
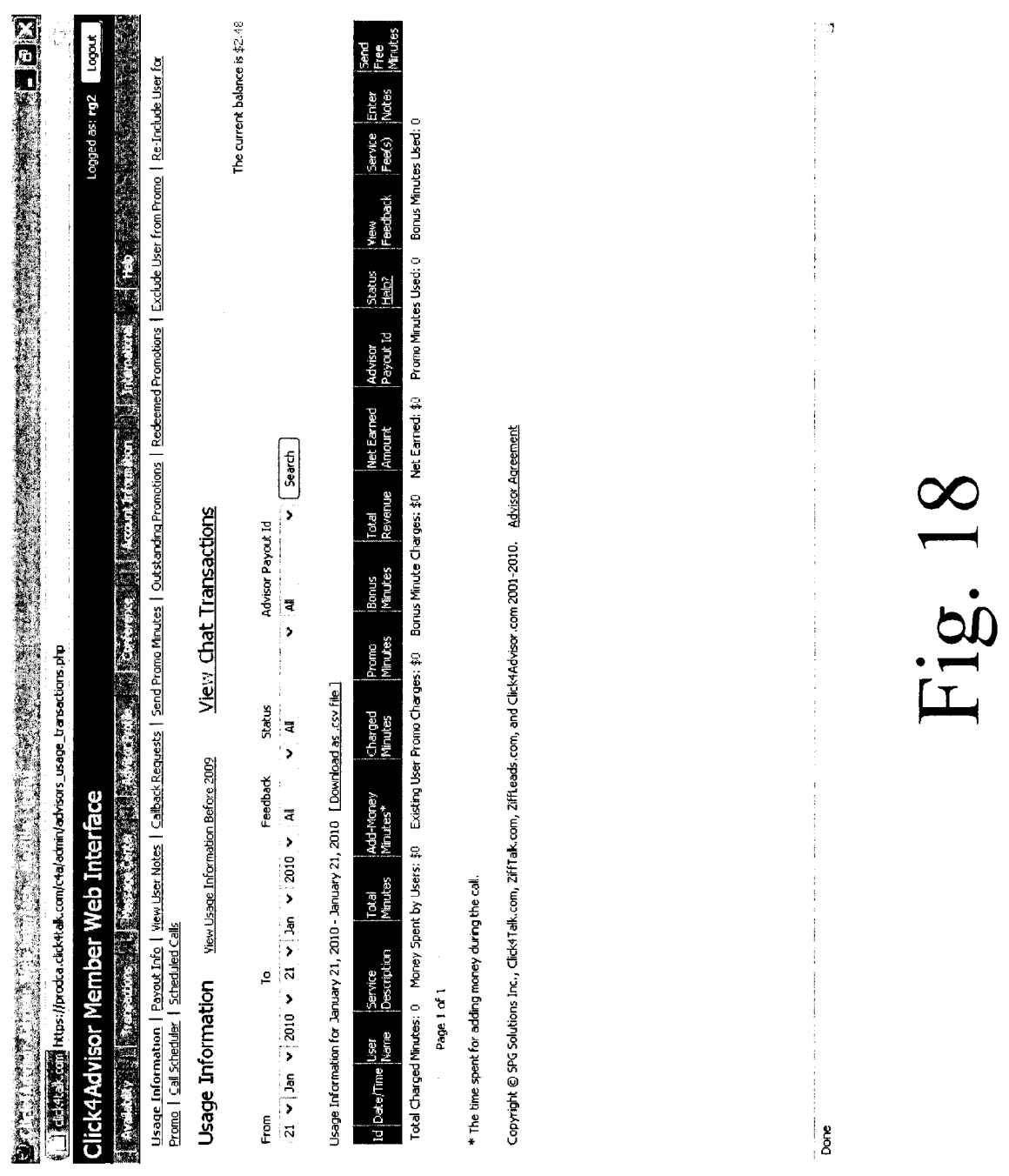
Figure 19:
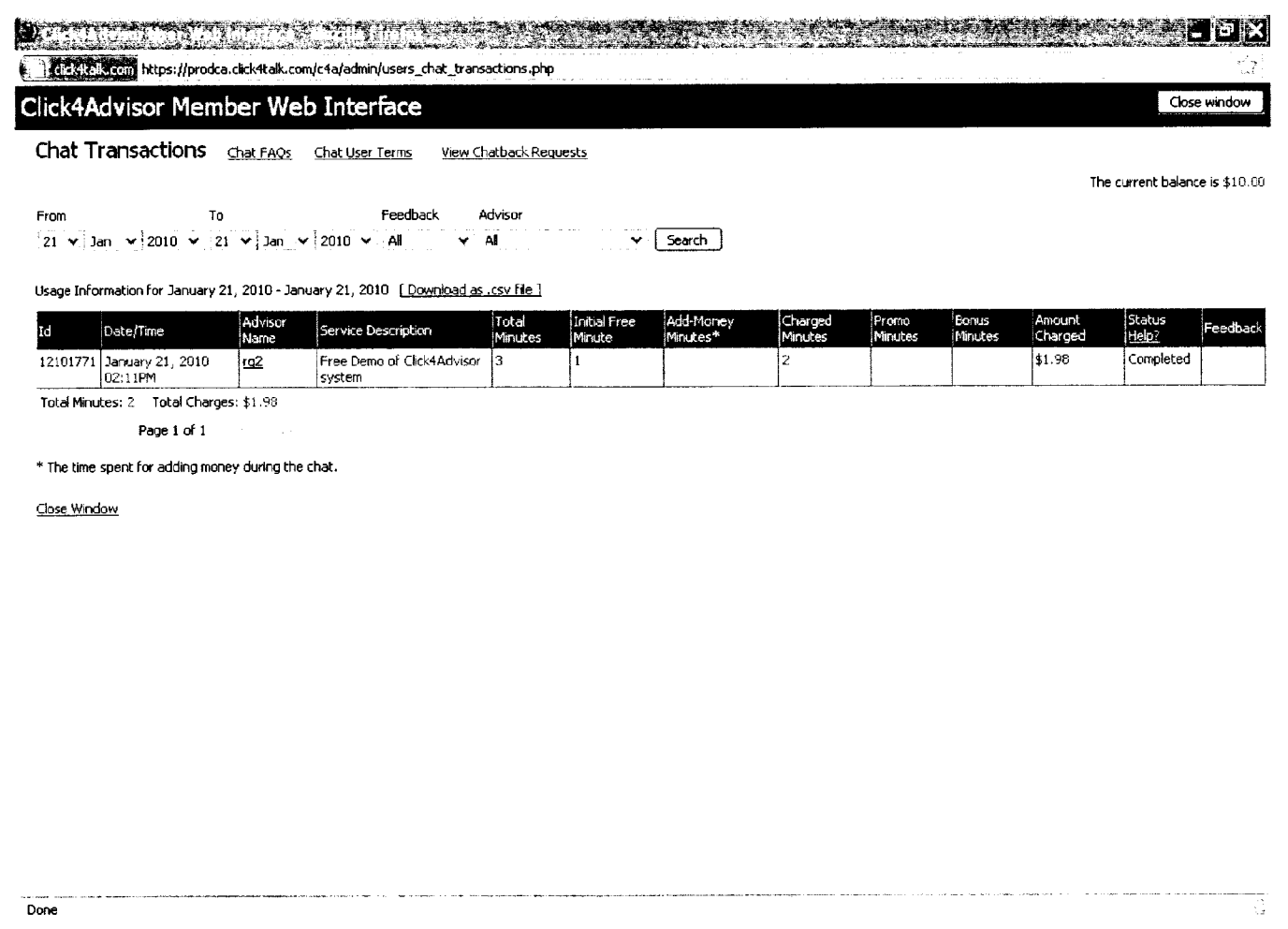

The system 1 will help an Agent manage their accounts by offering the Agent the option of automated payroll responsibility or a managed payout consisting of, deducting a pre-determined Agent service fee for each transaction and distributing the Agent fee to the Agent. The system 1, in the preferred embodiment, has a payout accounting screen, a sample shown in FIGS. 18 and 19, that displays the fees paid to the system per Service Provider 20 and a summary for the Agents based on their Service Providers' 20 transaction activity ands Users 10 based on their activity. The sample screen has the following fields: Date/Time, Payout ID, Service Provider/Agent description, payout method, Paid to, Amount and Detail. The screen will have a selection criterion for the records to display. This criterion includes from and to dates, advisor payout ID, Service Provider and User.

The system 1 will offer a number of payment options. The system 1 can either pay the Service Providers 20 directly for the Agent while also paying the Agent's service fee earnings to the Agent, or pay the Agent the entire earned amount for the Agent Group, who in turn will then pay their Service Providers 20. The system 1 can handle all of the accounting and payment processing for the Agent for all or part of their associated Service Providers 20.

The system 1 provides a method and techniques for expert Service Providers 20, in turn, to provide their service through an unlimited number of Independent Agent web-based channels or websites 300 without potential communication device conflict for consumers.

The system 1 will offer recognition, across the entire database of Service Providers' including potentially multiple different accounts associated with multiple different Agent group web sites 300, or whether a particular Service Provider is busy and provide a busy notification 116. Thereby, enabling a Service Provider 20 to register and be part of numerous different Agent group web sites 300, without concern for any potential conflict.

The system 1 will keep track of the amount of time that the User 10 used an Agent's Service Provider 20 and use that time multiplied by the Service Provider's billable rate and the Agent's service fee to calculate the amount due to the Agent. The system 1 will manage all of the time and billing records for the Agent and their Service Providers 20. The system 1 will enter this information into a database.

The present invention allows Service Providers to offer chat sessions to Users who have a positive balance or the promotional free minutes in their account. All chat sessions shall be conducted over the Internet. The chat session will always be between an Service Provider and a User. The User information shall be kept confidential and shall not be disclosed to the Service Provider. After and Service Provider has chosen to enable the Chat Service on their Service Provider account, they will be provided with a link to embed in their website or Online advertising.

The price per minute for the chat session varies from Service Provider to Service Provider. Each Service Provider sets their individual per minute chat session rate in their profile as shown in FIG. 20. A User's balance will increase and decrease as you deposit funds and have 'paid' chat sessions. User's will only be able to have a chat session if they have a positive balance in their account with at least two (2) minutes of chat/talk time.

The price per minute varies from Service Provider to Service Provider. Each Service Provider sets their individual per minute chat session rate. The minimum chat session rate a Service Provider can set is $0.99 USD. An Service Provider can have different per minute rates for the chat service and the phone service. To change an Service Provider's rate, the Service Provider simply clicks on the "Service Provider Profile" tab and enter the new rate under "Chat Rate Per Minute". If there is no chat rate assigned, the chat service will use the phone service rate.

When the chat session is in progress between User and Service Provider, they are shown as "Busy" so that they do not receive any one-on-one advice calls. Alternately, when a one-on-one session is in progress between User and Service Provider, they are shown as "Busy" so that they do not receive any chat session invitations.

If a Service Provider receives a chat session invitation and they DO NOT wish to chat, they simply decline the invitation. Once a Service Provider has declined a confirmation message will be displayed as well as a message will be sent to the User stating to try back later and/or to contact you using a one-on-one telephone advice link.

To view feedback from Users, regarding a Chat Session, a Service Provider logs in to their Service Provider account, clicks on the "Transactions" tab, and finds the Chat Session they want to view feedback on. On the far right of the display, there is a 'View Feedback' column. If the User has not provided feedback yet for the chosen chat session, within the allotted time frame, then the entry will show "Waiting". Once the User submits the feedback, the entry will show 'Submitted' and the Service Provider can click on the 'Submitted' link to view feedback. Users can only submit feedback with respect to chat sessions, which they have attended. The feedback should be provided within seven calendar days of the paid non-promotional chat session of six minutes or longer with Advisors.

Figure 29:
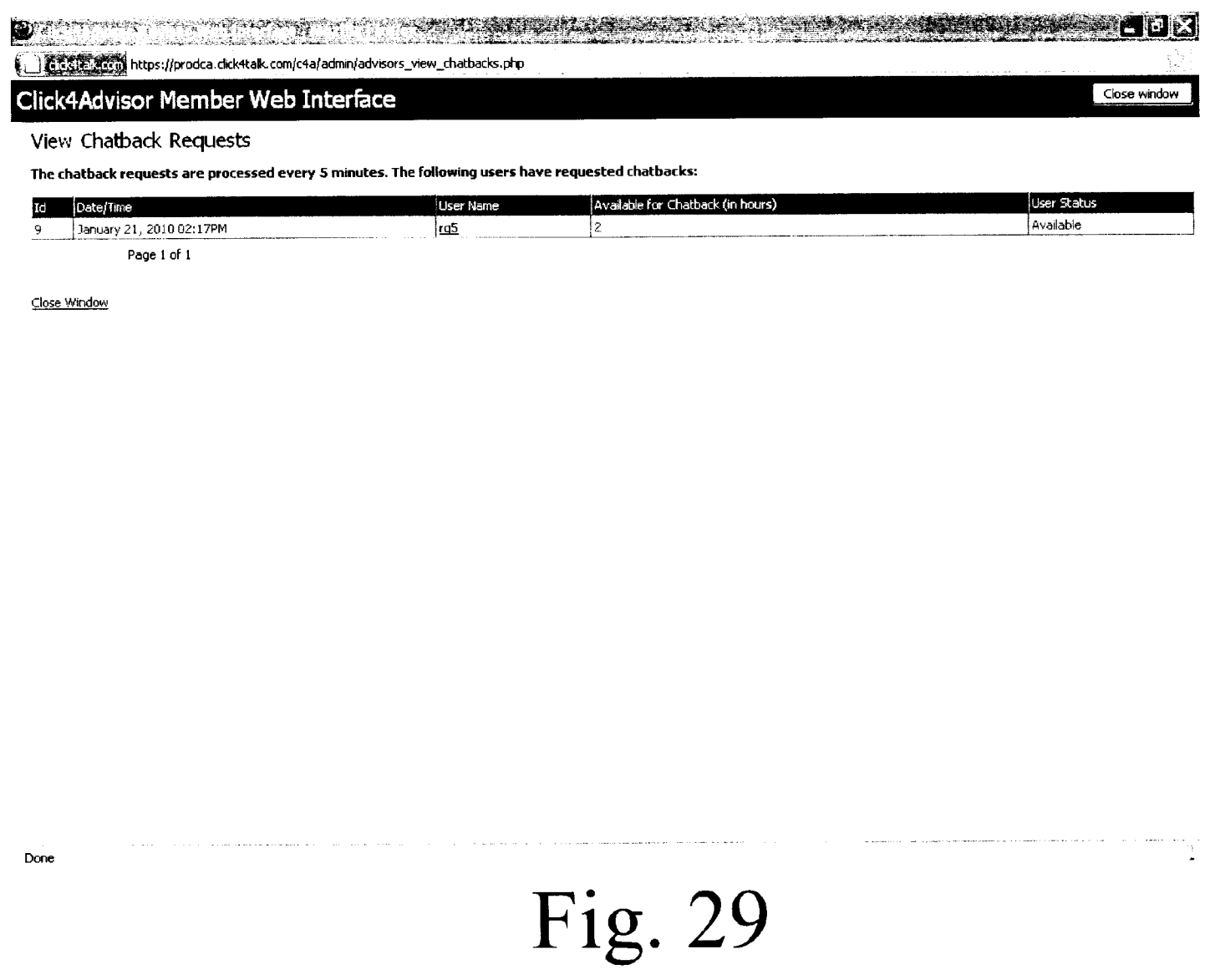

FIG. 28 shows a listing of User chat back requests. A user can enter a telephone number to receive a notification by phone when a Service Provider is ready and available for chat. Additionally, a User can request that the system send an electronic notice to them when a Service Provider is available for a chat. Electronic communications can be email, instant messenger, text, SMS, RSS, or any other electronic transmission. A User can also delete chat requests if they no longer require the service, but a Service Provider may only view chat requests submitted to him or her in the system as shown in FIG. 29. Finally, a User can review a list of all Service Providers they have contacted in the past. This history feature, shown in FIG. 30, provides many benefits to the User.

The system 1 is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system 1 can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A computer-implemented method of connecting two parties over an online chat in real time, the method comprising:
   having one or more Agents creating an associated selected plurality of one or more Service Providers;
   enabling the Agents to integrate their selected plurality of Service Providers into their own specialized websites for browsing by a User;
   having a User initiate a contact with a Service Provider via an Agent's specialized website;
   submitting an online chat session invitation by the User to the Service Provider;
   initiating a pre-recorded phone alert if the Service Provider has opted to get a phone alert when a new chat invitation is received; and
   connecting the User to an online chat session with the Service Provider, if the Service Provider is available and accepts the online chat session invitation;
   after a first pre-determined period of time, extracting in real-time, account balance of the User from a System Database;
   extracting Service Provider per minute compensation rate from the System Database;
   dividing the User account balance total by the Service provider per minute compensation rate;
   determining total minutes the User can connect to the Service provider until the User's account balance is depleted;
   displaying this information to the User textually in a pop-up window upon the User connecting to the Service provider; and
   displaying a graphical timer in the pop-up window, a countdown of the minutes remaining for the User to be connected to the Service provider and automatically terminating the online chat session or prompting said User to add more funds to said User account for continuing the online chat session;
   otherwise, prompting the User to enter a chat back request or to create and send an email to the Service Provider, if the Service Provider is unavailable or busy.

2. The method as described in claim 1, further comprising: generating information about the Service.

3. The method as described in claim 2, further comprising: providing a phone alert to the user when the service provider logs in and is available for a chat session.

4. The method as described in claim 2, further comprising: generating a message for the User by an electronic notification when the Service Provider is available.

5. The method as described in claim 2, further comprising: allowing the Service Provider to enter their hours of availability and rate.

6. The method as described in claim 1, further comprising: displaying the Service Provider's hours of availability and rate within the pop-up window.

7. The method as described in claim 1, further comprising: denying the connection if the User tries to initiate a connection without sufficient funds in the User account to pay the service provider's rate for a minimum fixed period of time.

8. The method as described in claim 1, further comprising: displaying in the pop-up window that the Service Provider is currently busy if the Service Provider is currently in another chat session.

9. The method as described in claim 1, further comprising: managing transaction records for the one or more Agents associated with the selected one or more said Service Providers.

10. The method as described in claim 9, further comprising:
reporting the transaction records.

11. The method as described in claim 10, further comprising:
calculating the total amount due to the Service Provider and the Agent based on the transactions records.

12. The method as described in claim 11, further comprising:
paying the Service Provider and the Agent the total amount due based on the calculated transactions records.

13. A computer-implemented method of connecting two parties over the Internet in real time, the method comprising:
having an Agent account;
assigning an Agent ID number to the Agent account;
having a Service Provider enter the Agent ID when registering as a new Service Provider;
linking all Service Providers under a single Agent ID into one account information and transaction activity management interface;
distributing the appropriate service HTML code to said Agent for each newly registered Service Provider thereby;
enabling said Agent to readily create own Internet-based collection of specialized Service Providers, and
connecting Users with these Service Providers for expert advice in real time via an online chat connection, if said Service Providers are available and accept the online chat connection;
after a first pre-determined period of time, extracting in real-time, User account balance information from a System Database;
extracting Service Provider per minute compensation rate from said System Database;
dividing the User account balance total by said Service provider per minute compensation rate;
determining total minutes said User can connect to said Service provider until said User's account balance is depleted;
displaying this information to said User textually in a pop-up window upon said User connecting to said Service provider; and
displaying a graphical timer in said pop-up window, a countdown of the total minutes remaining for said User to be connected to said Service provider and automatically terminating said online chat connection or prompting said User to add more funds to said User account for continuing said online chat connection;
otherwise, prompting said User to enter a chat back request or to create and send an email to said Service Provider requesting for an online chat connection, if the Service Provider is unavailable or busy.

14. The method as described in claim 13, further comprising: displaying within a pop-up window a full list of Service providers associated with said Agent and individual availability statuses for each of the Service providers.

15. The method as described in claim 13, further comprising:
allowing for said Users to remain in effect on a website of said Agent while navigating the Internet and being connected in an online chat connection with said Service Providers, by way of a series of progressive popup windows.

16. The method as described in claim 13, further comprising:
giving said Agent the option of self-managed payroll responsibility or,
a managed payout consisting of, deducting a pre-determined Agent service fee for each transaction and distributing the fee to said Agent.

17. The method as described in claim 13, further comprising:
having recognition, across the entire database of Service Provider, including potentially multiple different accounts, of whether a particular Service Provider is busy thereby; and
enabling a Service Provider to register and be part of numerous different Agent groups, and preventing connection conflicts.

18. The method as described in claim 7, further comprising:
providing the online chat session free of charge for the first period of time; and
charging said User account balance for the online chat session after the expiration of the fixed period of time.

19. The method as described in claim 1, further comprising:
terminating the online chat session when the User has insufficient funds in the User Account to pay the Service Provider's rate for any additional period of time for continuing the online chat session.

* * * * *